US011247375B2

(12) United States Patent
Duffner et al.

(10) Patent No.: US 11,247,375 B2
(45) Date of Patent: Feb. 15, 2022

(54) MOULD-CLOSING UNIT FOR AN INJECTION MOULDING MACHINE, AND METHOD FOR LOCKING A FORCE TRANSMISSION ELEMENT

(71) Applicant: ARBURG GMBH + CO KG, Loßburg (DE)

(72) Inventors: Eberhard Duffner, Starzach (DE); Rainer Bletscher, Baiersbronn (DE)

(73) Assignee: ARBURG GMBH + CO KG, Loßburg (DE)

( * ) Notice: Subject to any disclaimer, the term of this patent is extended or adjusted under 35 U.S.C. 154(b) by 38 days.

(21) Appl. No.: 16/958,206

(22) PCT Filed: Dec. 20, 2018

(86) PCT No.: PCT/EP2018/086444
§ 371 (c)(1),
(2) Date: Jun. 26, 2020

(87) PCT Pub. No.: WO2019/129670
PCT Pub. Date: Jul. 4, 2019

(65) Prior Publication Data
US 2021/0069955 A1    Mar. 11, 2021

(30) Foreign Application Priority Data
Dec. 27, 2017   (DE) ...................... 10 2017 223 822.4

(51) Int. Cl.
*B29C 45/64*   (2006.01)
*B29C 45/67*   (2006.01)
*B29C 45/68*   (2006.01)

(52) U.S. Cl.
CPC .......... *B29C 45/6728* (2013.01); *B29C 45/68* (2013.01); *B29C 2045/686* (2013.01)

(58) Field of Classification Search
CPC ......... B29C 45/64; B29C 45/66; B29C 45/67; B29C 45/6707; B29C 45/6728; B29C 45/68; B29C 45/688
See application file for complete search history.

(56) References Cited

U.S. PATENT DOCUMENTS 7,670,536 B2 *   3/2010   Schad .................. B29C 45/6728
                                                          264/328.1
9,469,063 B2     10/2016  Watarai

FOREIGN PATENT DOCUMENTS

DE   1529931        5/1970
DE   4032106 A1    5/1991
(Continued)

OTHER PUBLICATIONS

Formschliebkopfe. "Klemmen, Antreiben und Losen durch Hydraulikdruck, SITEMA-Power-Stroke", Jan. 31, 2016, Internet: http://www.sitema.de/gfx_content/pdf/de/powerstroke/SITEMA-TI-P11_DE.pdf, XP055262647.
(Continued)

*Primary Examiner* — Joseph S Del Sole
*Assistant Examiner* — Thu Khanh T Nguyen
(74) *Attorney, Agent, or Firm* — Cantor Colburn LLP

(57) ABSTRACT

A mould-closing unit for an injection moulding machine for processing plastics has a mould support which is movable relative to a stationary mould support (10). A mould-moving device is provided to move the movable mould support into and out of closure of an injection mould. At least one force transmission element is connected to the movable mould support and at its end remote from the movable mould support has a section (14a) which is assigned to the stationary mould support (10) and can be actuated for operative engagement. The stationary mould support (10) is assigned a locking device (15), which can be moved into interlocking operative connection with the actuatable section (14a) to apply a closing force during closure of the injection mould. According to the method, these elements are used to create a method for locking a force transmission element to a mould support of the injection moulding machine. The fact that the locking device (15) has floating clamping jaws (16) which can be moved into interlocking operative connection (Continued)

with the actuatable section (14a) during closure of the mould to lock the force transmission element and the stationary mould support (10) and at the same time are connected to at least one piston (18) of a piston-cylinder unit (17) for applying the closing force, means that a mould-closing unit is created in which the locking mechanism for locking the tie bars to the mould support is integrated in a common unit with the unit for applying the closing force.

23 Claims, 20 Drawing Sheets

(56) References Cited

FOREIGN PATENT DOCUMENTS

| | | |
|---|---|---|
| DE | 4403079 C1 | 4/1995 |
| DE | 19956190 A1 | 6/2001 |
| DE | 10318405 A1 | 11/2003 |
| DE | 60007980 T2 | 10/2004 |
| DE | 102014012096 A1 | 2/2015 |
| DE | 102016006956 A1 | 12/2016 |
| EP | 1068060 B1 | 9/2002 |
| JP | 01192519 A | 8/1989 |

OTHER PUBLICATIONS

International Search Report for corresponding application PCT/EP2018/086444 filed Dec. 20, 2018; dated Mar. 26, 2019.

\* cited by examiner

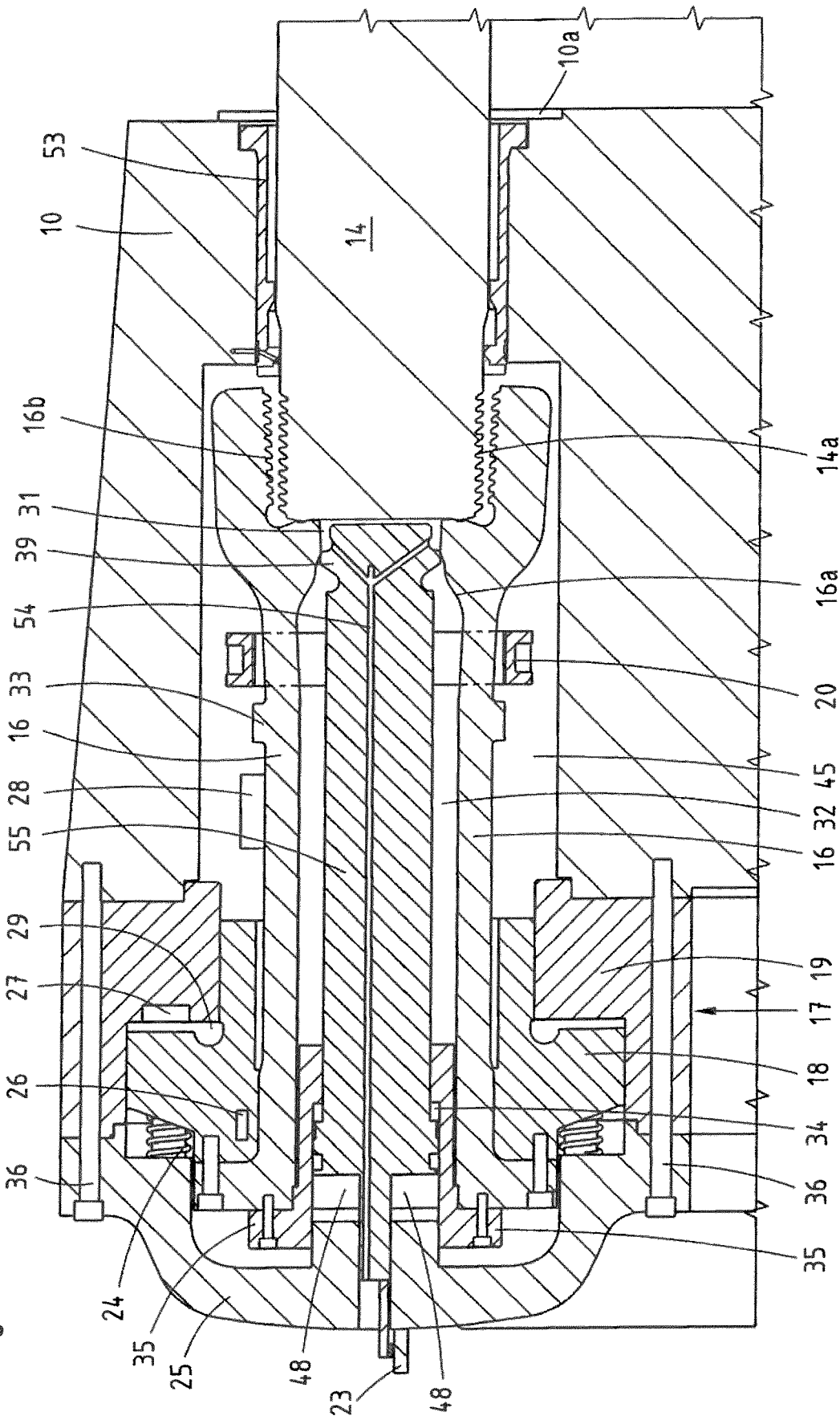

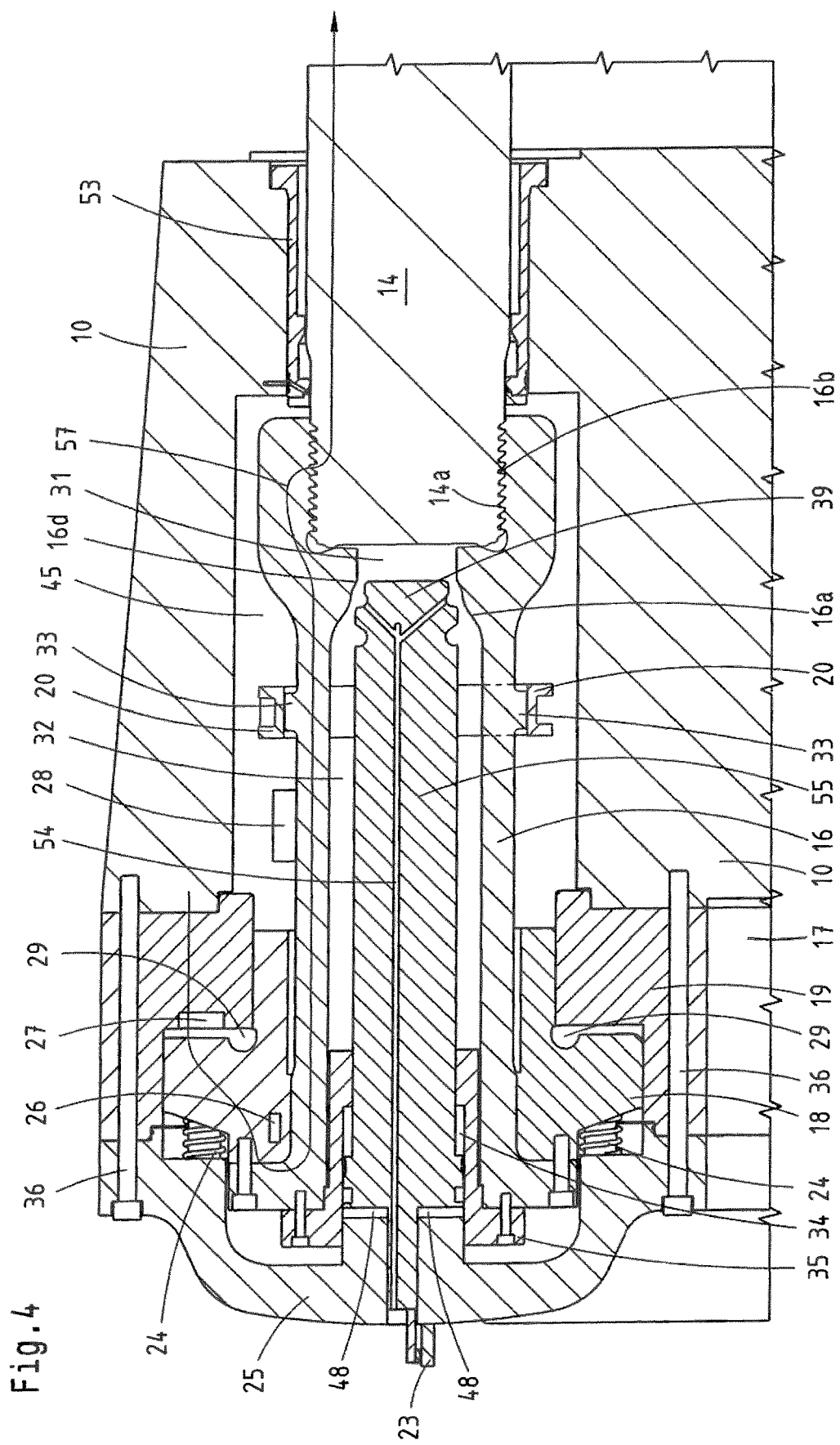

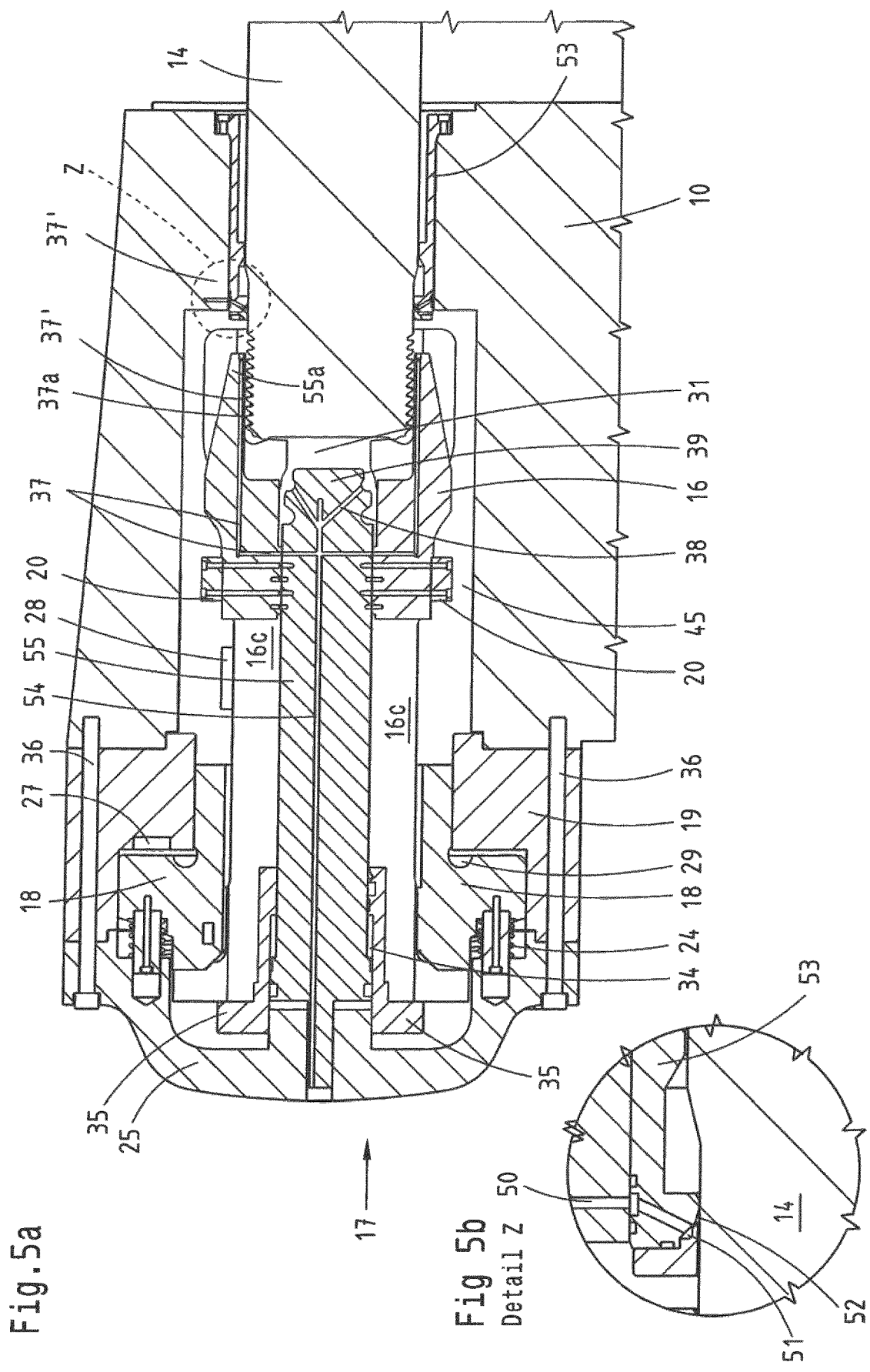

MOULD-CLOSING UNIT FOR AN INJECTION MOULDING MACHINE, AND METHOD FOR LOCKING A FORCE TRANSMISSION ELEMENT

CROSS-REFERENCE TO RELATED APPLICATIONS

The present application refers to and claims the priority of German patent application 10 2017 223 822.4, filed on 27 Dec. 2017, the disclosure of which is hereby expressly incorporated by reference into the subject matter of the present application in its entirety.

TECHNICAL FIELD

The disclosure relates to a mold closing unit for an injection molding machine for processing plasticizable materials such as plastics or powdery or ceramic materials and to a method for locking a force transmitting element on an injection molding machine.

In the context of this application, the following terms are used as follows:

The term "actively closing" system is understood to mean, in the context of a collet chuck, a system that, in an undeformed condition, is in a position in which the collet chuck is in a locked position with the element to be held by the collet chuck—that is to say, in the context of this patent application, with the force transmitting element or bar. In order to open an actively closing system, the collet chuck must thus be resiliently deformed radially—typically outwards—in order to disengage from the transmitting element.

Conversely, the term "actively opening" system is understood to mean a system that, in the rest condition—that is to say in the undeformed condition—does not lock the collet chuck and the force transmitting element to one another. A system of this kind is brought into a position in which the force transmitting element and the collet chuck are in operative engagement with one another by radial resilient deformation of the collet chuck—typically radially inwards.

The term "floating mounting" is understood to mean a mounting in which the mounted elements are always supported in at least one direction—that is to say movably with at least one degree of freedom—for example by resilient elements. Mounting of this kind can also be achieved if one element is connected to the rest of the unit by way of a hydraulic chamber or cylinder chamber.

The term "mold closure" of an injection mold is understood to mean the disposition in which the parts of an injection mold that are attached to platens of the injection molding machine abut against one another. This is typically the case when plasticized material is injected into the mold cavity of the injection mold. A traversing movement into and out of mold closure is thus a movement corresponding to opening and closing of the injection mold.

The term "mold height" is understood to mean the height of the mold measured in the closing direction, corresponding to the spacing between the movable platen and the stationary platen when the injection mold is closed.

The term "mold height adjustment device" is understood to mean a mechanism needed in order to achieve an optimum position of the movable and stationary platens when the injection mold is closed. The closing movement and the development of the closing force start from this position, such that when the injection mold is closed the maximum closing force can be applied. Mold height adjustment devices of this kind are also needed when closing paths are optimized, for example if injection molds of different mold heights are used on a single machine.

BACKGROUND

DE 15 29 931 A1 discloses a mold closing device, which comprises a stationary platen and a movable platen. The platens span between them a mold clamping space for receiving injection molds. The clamping device comprises a clamping cylinder, a pressure piston and a clamping bolt. In the rest position, four rocker arms are mounted in a ring-shaped part, which are pressed outwards by springs. If the pressure piston is pressurized and the clamping bolt penetrates the clamping cylinder, the rocker arms swivel into a recess in the clamping bolt and lock it. If pressure is taken off the pressure bolt, the rocker arms, supported by a spring, swing back into the rest position. The confoguration results in a floating collet chuck in the broadest sense, which can be converted into a positive-locking operative connection for locking the tie bars and platens.

From DE 103 18 405 A1 a comparable injection molding device is known, which has a stationary mold mounting platen and a movable mold mounting platen as well as tie bars for connecting the mold mounting platens. On one of the mold mounting platens, translationally movable jaws of locking devices for locking the mold mounting platen with the tie bars are provided. At least one of the jaws is spring-loaded or at least in some areas spring loaded, wherein the spring load exerts a force in the direction of the locking position of the jaws.

DE 600 07 980 T2 makes known a mold closing device with two platens that can move relative to each other. The closing mechanism comprises a compressible element which embraces a clamping rod for gripping the clamping rod and transmitting a closing force. Furthermore, a pressure piston with a bore and an actuating surface for frictional actuation of the compressible element is provided. The frictional actuation prevents a sliding movement between the compressible element and the pressure piston. Additonally, a sliding piston is provided for applying the closing force and for causing the compressible element to slide from an initial position to a preloaded position in which the compressible element is compressed by contact with the actuating surface.

From JP H01 192519 A a mold locking device is known, which clamps a tie bar as a force transmission element by frictional forces. By means of a wedge movement, surfaces inclined in opposite directions are locked together in such a way that a radial clamping force is exerted on the tie bar.

U.S. Pat. No. 9,469,063 B2 discloses a mold closing device in which a stationary platen and a movable platen are connected to one another by tie bars. The platens span a mold clamping space for receiving injection molds between them. Provided on the side of the movable platen are pistons of closing cylinders that where necessary engage with actuating portions of the tie bars. For the purpose of locking tie bar and movable platen, half nuts are controlled in operative engagement with the actuable portion such that the closing force can then be applied by another unit. (Cf also DE 10 2016 006 956 A1).

Locking of this kind, with a bayonet closure, is known from the company Husky Injection Molding System. For this purpose, the tie bar has regions in which a closing piston can engage, and regions along which the closing piston can slide, which is movable radially on the guide tie bar. Rotating the closing piston leads to a positive engagement such that at least some of the closing force can likewise be applied to this piston at the same time.

DE 10 2014 012 096 A1 discloses a method for operating a closing unit of a molding machine with a pressure mechanism that can cause a closing force to be applied to the movable platen by way of tie bars. For locking of the movable platen to the tie bars, a locking mechanism is provided. Although this means the platen is mounted movably, the locking mechanism, which is not connected to the platen, is not. The locking mechanism 13 is opened and closed by means of a piston-like device but is not mounted in a floating manner.

EP 1 068 060 B1 discloses a mold closing unit in which there is provided, in the movement region of the mold closing unit, a portion in which, when the platen is transferred into this region, the support plate is uncoupled such that the support plate itself can be moved by the drive in order to effect a mold height adjustment. However, for a solution of this kind it is a precondition that a three-plate machine is used or that the construction is that of a three-plate machine with supporting element, movable platen and stationary platen.

From DE 40 32 106 A1 it is known that, on a hydraulic press, in the closing position of the press tools a press ram mounted on a closing stroke drive is connected to a hydraulic press lifting drive by way of at least one coupling. The coupling comprises a coupling rod and a closing head, which receives the coupling rod and is positively lockable to the coupling rod. In order to ensure that the press stroke is seamlessly adjusted to the respective closing position of the press tools without the loss of a positive coupling, the closing head is supported in the direction of the coupling rod in a manner configured for screw adjustment.

DE 44 03 079 C1 discloses, on a mold closing unit of an injection molding machine, a force transmitting element that is formed by a plurality of tie bars which are movable together with the movable platen and which, when the injection mold is opened, leave the mold clamping space clear.

A common feature of the cited prior art is that that typically separate units are required on the one hand for locking the tie bars to one of the platens and also for applying the closing force.

Brief Summary

Proceeding from this prior art, the present disclosure provides a mold closing unit and a method for locking force transmitting elements to an injection molding machine in which the locking mechanism for locking the tie bars to the platen is compactly integrated into the unit for applying the closing force, to form a common unit, and fulfils several functions.

The mold closing unit has a stationary platen and a platen that is movable in relation thereto, which form a mold clamping space between them for the purpose of receiving injection molds. The movable platen is movable along a closing direction, for the purpose of closing and opening the injection mold. The movable platen can be moved into and out of mold closure of the injection mold by means of a mold moving device. The platens are connected to one another by way of at least one force transmitting element, wherein the force transmitting element is connected to one of the platens. In its region associated with the other platen, the force transmitting element has a portion that is actuable for the purpose of operative engagement. Provided on this other platen is a locking device that is movable into positive operative connection with the actuable portion of the force transmitting element, for the purpose of applying the closing force. The locking device has a floating collet chuck that is movable into positive operative connection with the actuable portion for the purpose of locking the force transmitting element and the platen during mold closure. At the same time, the collet chuck is connected to the piston of a piston cylinder unit for the purpose of applying the closing force. An unlocking element is arranged in the collet chuck, which is configured as an unlocking rod. The unlocking element for opening the collet chuck is arranged such that it can bring about opening not just from a cylinder chamber. The locking element is at the same time arranged such that when the collet chuck opens it abuts by its end face against the force transmitting element or tie bar, and thus it is possible, in particular if the injection mold sticks, to achieve opening at high force—that is to say high-pressure opening of the injection mold—from the same cylinder chamber from which the collet chuck was opened. Because the unlocking element consequently fulfils a number of functions, it is possible to achieve a compact construction of the entire locking device. As a result, a compact structural unit can be formed that can be mounted on one of the platens in a manner saving space.

The fact that the force transmitting elements, which preferably take the form of tie bars, are completely detachable moreover provides the structural conditions needed for the mold clamping space, in which the injection molds are received during the injection molding of molded parts, to advance completely freely in relation to the tie bars, which enables better access to the injection mold. It is still possible in this manner for force to be applied consistently and thus also a consistently good quality of the injection moldings to be ensured.

In this context, it is possible to use such a solution both on a three-plate machine and on a two-plate machine in which the unit for applying the closing force acts directly on one of the platens, with the result that a supporting element can be dispensed with.

Preferably, the collet chuck and the piston are parts of a self-contained assembly which, as a result, can also be supplied to the machine in the form of an assembly. This has advantages not only in the manufacture of the injection molding machine at the injection molding machine manufacturer's factory, but also when injection molding machines are to undergo maintenance rapidly and reliably in remote corners of the earth, since in that case such assemblies can either be kept properly in stock on site or be delivered there quickly. In this case, all that needs to be done at the point of installation is to replace the earlier assembly with this assembly.

In an advantageous embodiment, the collet chuck is forcibly lockable to the force transmitting element, in which case in the locked condition a piston of a piston-cylinder unit is configured to generate a high pressure for the purpose of generating the closing force. As a result, locking of the platen to the force transmitting element by means of the collet chuck and the application of the closing force are both performed in a single assembly.

It is advantageous if the piston for applying the closing force is actuable in opposition to the force of resilient elements, since in this case, on the one hand, it is possible to damp the closing force. In this way, as the tie bar is moved into the collet chuck, there is a protection against overloading, which may be the case for example as a result of the mold height being adjusted inappropriately. This simultaneously reduces the load on the entire injection molding machine. On the other hand, as a result of the piston being actuable from one end, it is possible to ensure that a reliably consistent force is applied. However, this configuration does not rule out the possibility that in principle a piston that is actuable from both ends is also usable.

In one exemplary embodiment, the unlocking element has—that is to say at its end adjacent to the positive operative connection between force transmitting element and collet chuck—a thrust piece which, when it abuts against the collet chuck, causes a radial resilient deformation of the collet chuck. This allows the collet chuck to be actuated in a simple manner and hence to be brought into and out of operative engagement with the force transmitting element.

Favourably, for the purpose of applying the closing force by way of the collet chuck, the piston is mounted by means of an associated mounting on at least one unlocking element that is arranged centrally in the collet chuck. As a result, the connection between the collet chuck and the piston, in the form of a floating mounting, is ensured in a simple manner in the axial direction—that is to say in the direction of closing the injection molding machine—using simple devices. In a particularly preferred embodiment, the likewise axially movable unlocking element, for its part, is then guided in a manner movable in relation to the cylinder cover, within a plain bushing or an element integrally formed on the cylinder cover. This ensures axial guidance of the unlocking element and hence of the entire unit comprising the collet chuck and the piston which unit is received in the locking device.

In the exemplary embodiment of FIGS. 3 to 5b, there is illustrated as an advantageous embodiment an actively closing collet chuck: that is to say that the collet chuck is configured such that, in the undeformed condition, it will always tend to ensure operative engagement between the force transmitting element and the collet chuck. In this case, in the radially resiliently deformed open condition, the collet chuck, which is mounted such that it is axially movable on the platen by way of a cylinder for the piston, forms a receiving opening for the purpose of having the portion of the force transmitting element that is actuable by the collet chuck moved into it. A solution of this kind ensures that the operative engagement between the force transmitting element and the collet chuck is always adopted automatically provided that the mutually operatively engaged elements are in the appropriate position. Preferably, the result is that, with active closing, in a radially undeformed condition the collet chuck engages by means of a toothing in a toothing of the actuable portion, and this condition can be opened again by a corresponding exertion of force—that is to say deformation of the collet chuck.

Preferably, there is provided as an additional securing element a sliding sleeve that is radially attached to the unlocking rod—which is in the form of an unlocking element—and that in the radially undeformed condition at the collet chuck comes into abutment with an abutment region of the collet chuck, for the purpose of securing the collet chuck to prevent radial opening. This not only ensures that, with active closing, the collet chuck comes into operative engagement automatically, but also that it is prevented from opening unintentionally there. Given the high forces to be transmitted, this is an additional safety feature.

In an alternative embodiment, the mold closing unit may preferably also be configured such that the opened condition of the collet chuck is the undeformed condition. In that case, the collet chuck may be mounted axially on the platen, similarly to the "actively closing" alternative, by way of a cylinder for the piston, but in this case it has the receiving opening for introduction of the actuable portion of the force transmitting element in the undeformed condition. Preferably, the collet chuck is then radially resiliently deformed in order to make the operative connection between the force transmitting element and the collet chuck such that this is a "passively closing" embodiment.

Preferably, in such a "passively closing" configuration, a further piston is provided, whereof the end face acts on the collet chuck, in order to fix the collet chuck in its closed position.

In order to achieve a lubricant supply that saves space and yet operates reliably, there is preferably provided, on the unlocking rod and/or in a bore in the platen in which the force transmitting element is configured to be received, a lubricant supply that has the appropriate elements required for a supply of this kind. Free spaces that are present in any case are utilized for the supply of lubricant, and the lubricant feed takes place at precisely the location at which the lubricants are required—that is to say in the region in which the force transmitting element is introduced into the platen, and in the region in which there is abutment and relative movement between the unlocking element and the collet chuck.

Preferably, according to a further embodiment the collet chuck may also take a form in multiple parts, and have clamping elements that are mounted to rotate transversely to the closing direction. The clamping elements are mounted on a mounting element and are configured to be brought in and out of operative engagement with the force transmitting element, either by means of an actuation element connected to an unlocking element or by means of a sliding sleeve. In this case too, the clamping elements are preferably moved forcibly. The advantage in this embodiment is that there is no need for resilient deformation of the collet chuck but, conversely, corresponding guidance and mounting of the clamping elements must be ensured.

Preferably, the force transmitting element is formed by a plurality of tie bars that are connected in common to the movable platen such that a central introduction of force is possible. Moreover, this ensures that there is free access to the mold clamping space, since once the collet chuck has been unlocked the tie bars are movable together with the movable platens. As an alternative, it is possible to work with force transmitting elements that are guided around the mold clamping space.

The disclosure also provides a method for locking a force transmitting element to a platen of an injection molding machine. For this method, the injection molding machine has the structural elements including a stationary platen, a movable platen, a mold moving device and at least one force transmitting element, wherein during mold closure of the parts of the injection mold on the other platen an actuable portion of a force transmitting element is locked by positive engagement by means of at least one locking device and, in the condition locked in this way, a closing force that acts by way of the force transmitting element is applied. Because the force transmitting element is mounted in floating manner on the other of the platens by means of at least one collet chuck that is at the same time connected within the locking device to a piston for the purpose of applying the closing force, not only is a compact structural solution provided. At the same time, a reliable solution is ensured for applying the closing forces that are primarily required in the locked condition. The floating mounting contributes to ensuring that the structural parts are not excessively loaded, since, in both directions of the closing direction, a corresponding space is always provided by way of which forces and moments of inertia can be absorbed. As a result, the effect is that when the tie bars move in, the possibility of hard abutment between the tie bar and the collet chuck, for example as a result of positioning errors, is minimized and so the structural parts are protected from wear and failure. If the unlocking element is not only put under load for the purpose of opening the collet chuck but is arranged such that pressure can also be applied to the force transmitting element by the application of further force from the cylinder chamber that causes the opening, additionally high-pressure opening of the injection mold can be implemented by the same element.

Preferably, not only is the collet chuck forcibly locked to the force transmitting element but at the same time a high pressure is generated in the locked condition by means of the piston, for generating the closing force. This allows both locking and force generation to take place in the same structural unit, which can contribute to a smooth transition between locking and pressure generation and hence also to shortening cycle times.

In a preferred exemplary embodiment, the resilient deformation of the collet chuck is performed by means of a thrust piece, which is preferably arranged on the end face of an unlocking element arranged centrally in relation to the collet chuck. Because of the central arrangement of the thrust piece in a space of the unlocking element which is required on the one hand because of the construction of the free space provided and on the other hand for unlocking, both unlocking and resilient deformation can be performed reliably using the same element.

If the structural parts of the locking device are preferably operated such that the piston is moved by way of the collet chuck with at least one mounting in an unlocking rod arranged centrally in the collet chuck, the result is a compact unit that can fulfil a number of tasks simultaneously, namely mounting of the piston for the purpose of applying pressure and locking and unlocking of the locking device.

In order to achieve reliable guidance and hence also exactness when applying the closing force and also when moving the required structural parts, the unlocking element may be moved within a sliding sleeve that takes the form of a mounting, or within an integrally formed element that takes the form of a mounting, relative to a cylinder cover of a cylinder for the piston. The result is that elements grouped together into a unit cooperate for the purpose of implementing the various steps required in the course of the injection molding procedure, primarily when closing the injection mold. This can be ensured in a simple and favourable manner, and at the same time contributes to the desired high quality of the injection moldings to be manufactured.

According to a preferred embodiment of an actively closing collet chuck, in the radially resiliently deformed, open condition the collet chuck has a receiving opening for the actuable portion of the force transmitting element introduced into it. If the radial deformation is then reversed, the desired positive locking between the collet chuck and the transmitting element is established. This allows locking to be achieved by a few method steps before the closing force is applied.

In an alternatively preferred, passively closing embodiment of the collet chuck, the receiving opening in the collet chuck is provided in the radially undeformed, open condition, such that in this condition the tie bar can be introduced into the receiving opening. The collet chuck is then radially inwardly resiliently deformed and as a result the operative connection with the force transmitting element ensured. This likewise allows rapid and effective locking between the force transmitting element and the collet chuck to be achieved, in an alternative manner.

According to a further embodiment, as an alternative the collet chuck can preferably also take a form in multiple parts, with clamping elements that are mounted to be rotatably movable transversely to the closing direction. The clamping elements are mounted on a mounting element and, as a result of a relative movement of the unlocking element in relation to the clamping elements, can be brought into and out of operative engagement with the force transmitting element either by an unlocking element connected thereto or by a sliding sleeve, which may where appropriate also be movable independently. The clamping elements are preferably forcibly guided in order to ensure a reliable flow of forces and a reliable connection between the force transmitting element and the clamping element.

BRIEF DESCRIPTION OF THE DRAWINGS

The disclosure is explained in more detail below with reference to several exemplary embodiments illustrated in the attached Figures, in which:

FIGS. 3, 4 show a section along the lines and IV-IV respectively in FIG. 8, through a locking device in the open and closed condition respectively, FIG. 5*a* shows a section along the line Va-Va in FIG. 8, through a locking device according to FIG. 4, FIG. 5*b* shows a detail on a larger scale, in the region Z in FIG. 5*a*, FIGS. 6*a*, 6*b* show a section through a locking device in an alternative second exemplary embodiment, in the open and closed condition.

DETAILED DESCRIPTION

The disclosure is now explained in more detail by way of example, with reference to the attached drawings. However, the exemplary embodiments are only examples, which are not intended to restrict the inventive concept to a particular arrangement. Before the disclosure is described in detail it should be pointed out that it is not restricted to the respective structural parts of the device and the respective method steps, since these structural parts and methods may vary. The terms used here are merely intended to describe particular embodiments and are not used restrictively. Moreover, where the singular or the indefinite article is used in the description or the claims, this also refers to a plurality of these elements unless the overall context unambiguously indicates otherwise.

Figure 1:
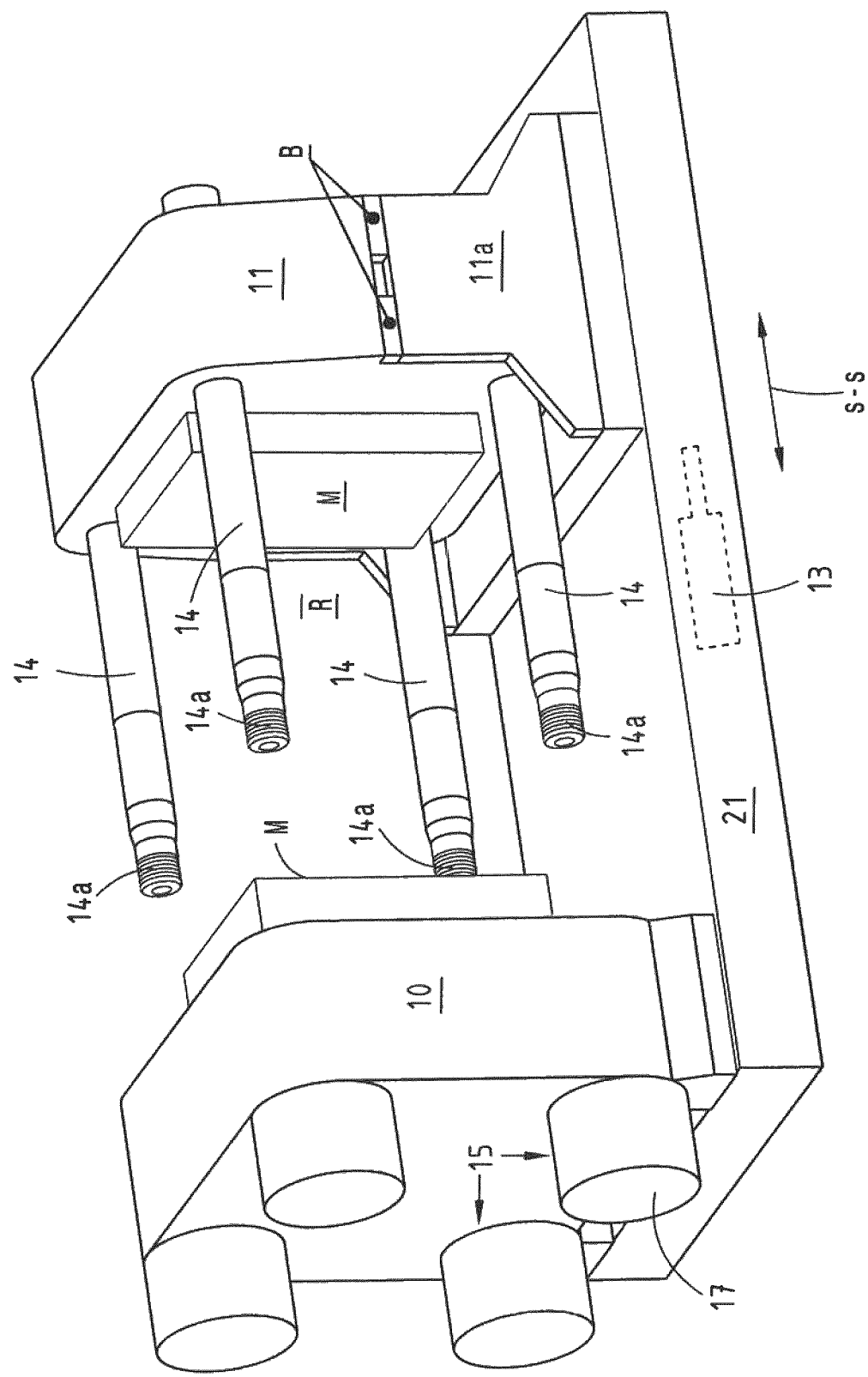
FIG. 1 shows a three-dimensional illustration of a mold closing unit of a two-plate machine, in a first exemplary embodiment.

The Figures show a mold closing unit for an injection molding machine for processing plastics and other plasticisable materials. FIG. 1 shows a schematic illustration of a mold closing unit of this kind on a two-plate machine in which the locking device 15 and a piston-cylinder unit 17 are arranged on the stationary platen 10, for the purpose of applying the closing force. The movable platen 11 is arranged on a machine base 21 such that it is movable in a closing direction s-s, wherein the movement can be performed for example by way of a mold moving device 13 which is arranged in the machine base 21 and is only schematically indicated, such as a rack-and-pinion drive or a hydraulic drive, or in another suitable manner. The movable platen 11 is supported on the machine base 21 by way of a bench-mounted carriage 11a, wherein the fact that the movable platen 11 is mounted vertically approximately centrally means the introduction of force is optimized in respect of torque. The stationary platen 10 and the movable platen 11 span a mold clamping space R for receiving injection molds M, and this can be closed and opened in a closing direction s-s by the mold moving device 13. The mold moving device 13 thus serves to move the movable platen 11 into and out of mold closure of the parts of an injection mold M that are received between the platens.

At least one force transmitting element, in the exemplary embodiment a plurality of tie bars 14, are connected to one of the platens 11, 10, in the exemplary embodiment to the movable platen 11. At the end spaced from the one of the platens, the force transmitting elements have a portion 14a that is provided for operative engagement with the other platen 10, 11—here the stationary platen 10—and is thus actuable. Provided on the other platen—that is to say in the exemplary embodiment the stationary platen 10—is a locking device 15 which, when the parts of the injection mold M are in the mold closure position, can be brought into positive operative connection with the actuable portion 14a of the at least one force transmitting element for the purpose of applying a closing force.

The mold closing unit represents only a part of the injection molding machine, since conventionally an injection molding unit (not illustrated in the drawing) is additionally provided, by way of which the material to be plasticized is plasticized and injected into a mold cavity of the injection mold. However, the corresponding construction of an injection molding machine, comprising the parts mold closing unit and injection molding unit, is known to those skilled in the art, so it is not discussed in more detail in this application.

According to FIG. 3, the locking device 15 has a floating collet chuck 16 that is transferable into positive operative connection when it engages with the actuable portion 14a for the purpose of locking the force transmitting element (tie bar 14) and the other of the platens (stationary platen 10) during mold closure. Here, the collet chuck 16 is connected to the piston 18 of a piston-cylinder unit 17, or at the same time forms part of the piston of the piston-cylinder unit 17 for the purpose of applying the closing force. The associated construction is discussed in more detail below.

Figure 2:
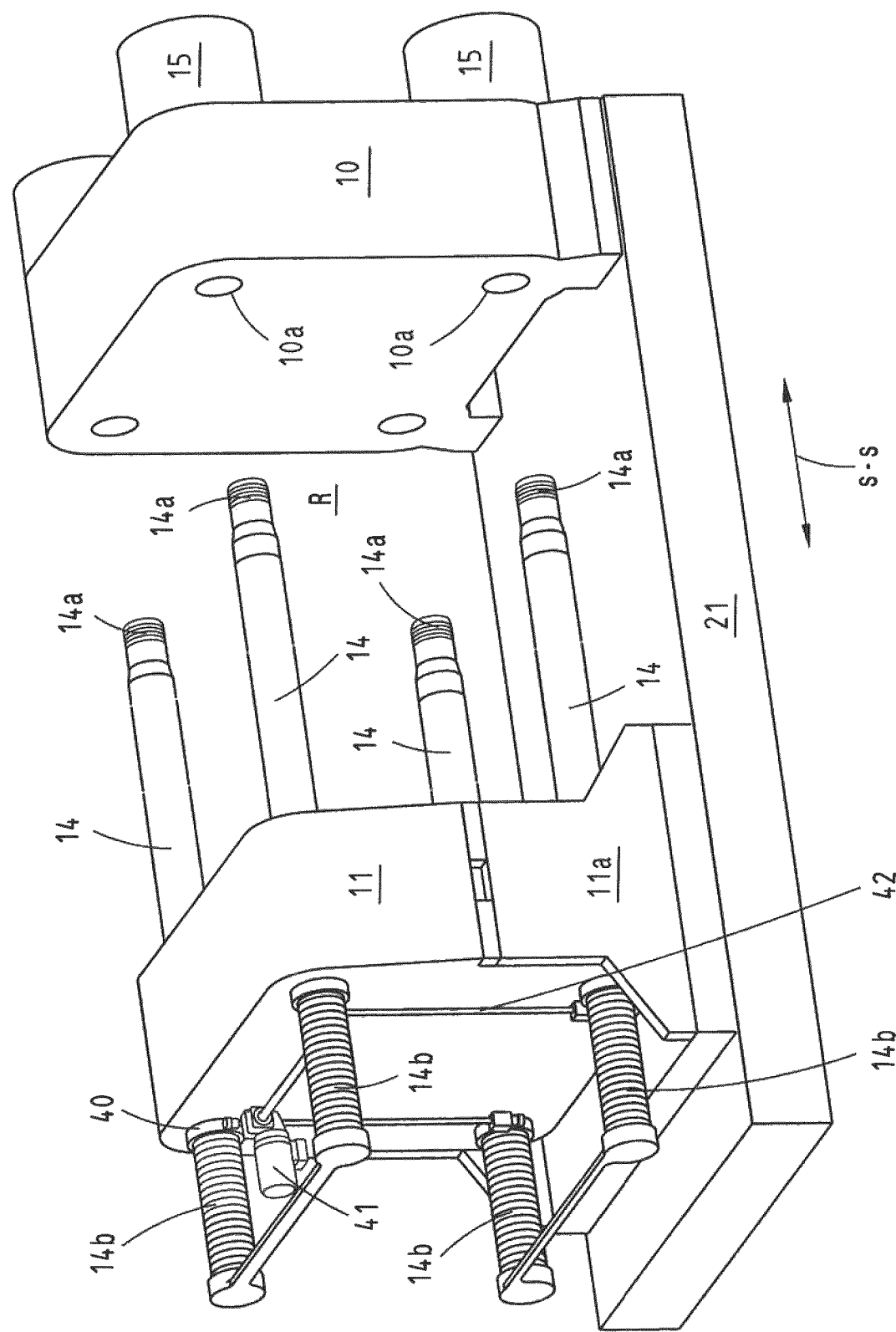
FIG. 2 shows a three-dimensional illustration of the molding closing unit from FIG. 1, looking towards the mold height adjustment on the movable platen.

According to FIGS. 1 and 2, the at least one force transmitting element is formed by a plurality of tie bars 14 that are movable together with the movable platen 11 and, when the injection mold M is opened, leave the mold clamping space R clear. In order to produce mold closure, the tie bars 14 penetrate into receiving bores 10a in the stationary platen 10 by means of their actuable portion 14a such that the positive connection between the platen and the force transmitting element can then be made there, in a manner described below. In this context, the tie bars 14 are pre-centred in the receiving bores 10a in mounting bushings 53 which, for this purpose, are provided with a compatible entry chamfer.

FIG. 2 further shows, on the side of the movable platen 11 remote from the mold clamping space R, the mold height adjustment device 42, which is required in order to optimise the closing paths and/or to ensure the optimum position of the platens during mold closure. It can be seen that in this region the tie bars 14 have a threaded portion 14b that is operatively connected to nuts 40. The nuts are adjusted by way of a motor 41 and corresponding gear units, resulting in a relative movement in the closing direction s-s between the force transmitting elements and the movable platen 11.

The construction of the locking device is explained in more detail below with reference to FIGS. 3 and 4. FIG. 3 shows a section through a locking device 15, along the line in FIG. 8, wherein the collet chuck 16 is also shown in section over its full length in FIGS. 3, 4. The structural parts are mounted from the outside inwards—that is to say that the piston 18 is supported against the cylinder 19. The collet chuck 16 is connected, for example being screwed, to the piston 18, and a sliding sleeve 35 is coupled to the collet chuck 16, at its left-hand end as seen in the Figures. The unlocking element, which takes the form of an unlocking rod 55, is guided in the sliding sleeve 35 in the rear region, centre left as seen in the Figures, and the unlocking rod 55 is centred at the front, on the right as seen in the Figures, by way of the point at which the thrust piece 39 arranged at the front end of the unlocking rod abuts against the cone 16a of the collet chuck 16. (In the embodiments of FIGS. 1 to 6b, the unlocking element is called the unlocking rod 55, and the mounting is called the sliding sleeve 35.) However, the collet chuck 16 is also connected to the piston 18 of the piston-cylinder unit 17, the piston 18 being intended to apply the closing force. The piston 18 is mounted in the cylinder 19, which takes the form of a high-pressure cylinder tube. The cylinder 19 is closed by the cylinder cover 25, on the left as seen in FIG. 3. The piston 18 can be moved in the piston-cylinder unit 17 by the application of fluid in the cylinder chamber 29, to the left as seen in FIG. 3, in opposition to the force of resilient devices such as the springs 24. During this movement, the collet chuck 16 and the sliding sleeve 35 are also moved to the left, on the unlocking rod 55. The collet chuck 16 is thus supported by way of the sliding sleeve 35, as guide element, on the piston 18 and hence on the cylinder 19. The unlocking rod 55 is thus guided in the sliding sleeve 35 and can be displaced in the horizontal direction. This allows the unlocking rod 55 itself to be oriented in the collet chuck 16 without this having the effect of providing a mounting for the collet chuck 16.

In the position according to FIG. 3, the locking device 15 is in a deformed position—that is to say it is passively opened by the thrust piece 39. From the position in FIG. 3, in which the thrust piece 39 keeps the collet chuck 16 open, pressure is applied in the cylinder chamber 34 by the supply of a fluid, wherein the unlocking rod 55, together with the thrust piece 39, is moved to the left from the position in FIG. 3 into a position according to FIG. 4—that is to say in the direction of the cylinder cover 25—and where appropriate comes into abutment against the cylinder cover 25. As a result, the thrust piece 39 moves along the edge line 16d and out of the region of the cone 16a, resulting in the free space 31. During this, the unlocking rod 55 moves with the thrust piece 39 in the annular space 32. This movement has the result that the collet chuck 16 is resiliently deformed back into its original shape, that is to say achieves an actively closing position, wherein the toothing 16b of the collet chuck 16 moves radially inwards and thus comes into engagement with the toothing of the actuable portion 14a of the force transmitting element or the tie bars 14. When the load on the collet chuck is relieved, as a result of the thrust piece 39 being pushed back, the collet chuck moves back into the closed starting position. In this way, locking is achieved between the locking device 15 attached to the stationary platen and the tie bar 14. As a result of optimized machining of the toothing geometry, it is possible to influence the bias force of the engaging elements (tie bar, collet chuck) that prevails in the starting position. Thus, when acted upon by pressure, the position of the locking device 15 is actively closed or locking, because the collet chuck 16 is in operative connection with the force transmitting elements without any action by external forces.

FIGS. 3, 4 thus show a unit in which the elements of the collet chucks 16, as flexure beams, are configured such that the toothing always strives to close automatically (the principle of active closure, passive opening). Here, the thrust piece 39 is needed to activate the opening movement.

In order to apply the closing force, pressurized medium is supplied to the cylinder chamber 29, whereupon the piston 18 is moved to the left as seen in FIG. 4, in opposition to the force of the spring 24, and as a result pulls on the tie bars and thus applies the closing force, where appropriate under high pressure. In principle, in an embodiment not illustrated in the drawing, the piston 18 could also take a form such that fluid can be applied to it at both ends. In this case, the springs 24 could be dispensed with.

The locking device 15 is attached to the stationary platen 10 by way of the attaching devices 36, wherein the cylinder cover 25 is pressed to the cylinder 19 by way of the attaching devices 36 and both are together connected to the stationary platen. The movements and forces that arise when the locking unit is actuated are detected by way of position sensor 23, closing force sensor 26, a pressure sensor 27 for the fluid, and a strain gauge 28.

Because it is mounted in opposition to the springs 24 and by way of the cylinder chamber 29, the piston 18 and hence also the collet chuck 16 attached thereto are mounted in floating manner in the locking device 15.

FIGS. 3 and 4 show that a sliding sleeve 20 is mounted on the locking device 15, wherein in the embodiment the sliding sleeve 20 is attached to the unlocking rod 55 by means of attaching devices according to FIG. 5a. This sliding sleeve is in the position according to FIG. 3—that is, with the collet chuck 16 open—in a region allowing radial resilient deformation of the collet chuck. If, however, the unlocking rod 55 moves from the position in FIG. 3 to the left, into a position according to FIG. 4, and hence in relation thereto the collet chuck 16 moves to the right, an abutment region 33 of the collet chuck 16 comes under the sliding sleeve 20 according to FIG. 4, with the result that the sliding sleeve 20 prevents the collet chuck 16 from making an unintentional radial movement and hence unintentionally opening the lock between the stationary platen 10 and the force transmitting element, and thus from opening in this way.

In this locked condition of the locking device 15, the flow of force starts from the cylinder chamber 29, which is arranged between the cylinder 19 attached to the stationary platen 10 and the piston 18, and flows through the piston 18 to the collet chuck 16, which is guided on the cylinder cover 25 by way of the sliding sleeve 35, through the mutually engaging toothings and to the tie bar 14, which for its part is mounted axially movably in the mounting bushing 53 in the stationary platen 10. The collet chuck 16 has biomimetic dimensions in order to achieve an ideal flow of force.

For the purpose of opening the locking device 15, pressure is applied to the cylinder chamber 48, which in FIG. 4 is arranged on the left-hand side of the unlocking rod 55. As a result, the unlocking rod 55 moves to the right as seen in FIG. 4, into a position according to FIG. 3, as a result of which the thrust piece 39 comes into abutment against the edge line 16d of the collet chuck 16 again and hence presses the toothing 16b of the collet chuck 16 radially outwards and hence out of engagement with the toothing of the actuable portion 14a of the force transmitting element or tie bars 14. The edge line 16d is configured such that the thrust piece 39 comes into abutment gradually and gently along a curve first against the collet chuck cone 16a and then with a slight force seamlessly initiates a radially outward movement away from the toothing and finally provides sufficient spacing for the tie bars to move out and in.

FIG. 3 shows that in this position the end face of the unlocking rod 55 is at a small spacing from the end face of the force transmitting element or tie bar 14. For this reason, if the injection mold M received in the mold clamping space R does not yet open in this position simply as a result of the mold moving device 13, it is possible to additionally support the procedure of opening the injection mold M by increasing the pressure in the cylinder chamber 48, in the manner of high-pressure opening, in which case the end face of the unlocking rod 55 then presses against the end face of the tie bar 14.

Figure 8:
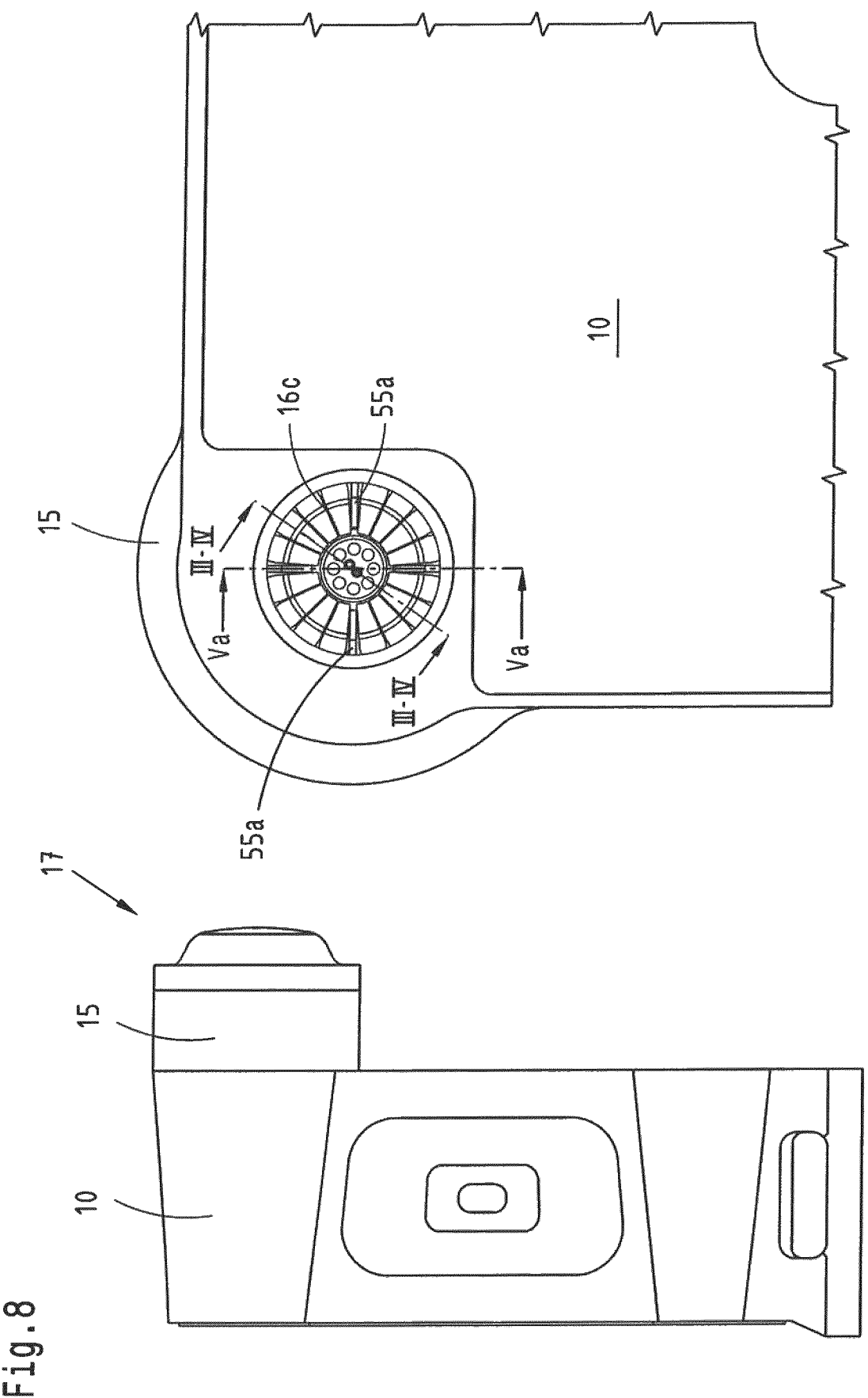
FIG. 8 shows a detail on a larger scale of a locking device, in side view and looking towards the stationary platen from the direction of the clamping plate.

FIG. 5a shows a section along the line Va-Va in FIG. 8, through the locking device 15. The section is taken such that in the front part of the unlocking rod 55 the lubricant plate 55a appears in section, but otherwise the section runs through a slot 16c between the individual segments of the collet chuck 16. It can be seen in FIG. 8 that four of these lubricant plates 55a are provided in this region, each covering an angle of 90° of a circle in the section, with lubricant slots 37a between them. It can be seen, in the centre of FIG.

5a, that the sliding sleeve 20 is attached to the unlocking rod 55 of the thrust piece 39 by way of attaching devices. In the interior of the unlocking rod 55 there runs a lubricant supply line 54 through which lubricant is supplied to the abutment region between the thrust piece 39 and the collet chuck cone 16a of the collet chuck 16, initially by way of the lubrication 38. The lubricant can branch in the unlocking rod 55 also into further lubrication ducts 37 intended for lubricating the toothing 16b of the collet chuck and the toothing of the actuable portion 14a of the tie bar 14, which during clamping engage with one another. These toothings 14a, 16a may also take the form of threads and serve for positive clamping engagement. As an alternative or in addition, the toothings may also be lubricated by the lubrication that is illustrated on a larger scale in FIG. 5b, a detail Z of FIG. 5a. When the movable platen is moved by means of the mold moving device 13, 13', the actuable portions 14a of the tie bars 14 reach through the mounting bushings 53 mounted in the stationary platen, and from there into the bores 45 into which the collet chuck 16 penetrates from the opposite side of the platen 10. In the region of transition between the mounting bushing 53 and the bore 45, lubricant is supplied by way of the lubricant feed 50 to the reservoir 51 according to FIG. 5b, from where lubricant is discharged to the actuable portion 14a of the tie bar 14 through an annular gap, while the tie bar 14 is supplied to or moved away from the collet chuck. This allows reliable lubrication of this region to be performed.

Figure 6A:
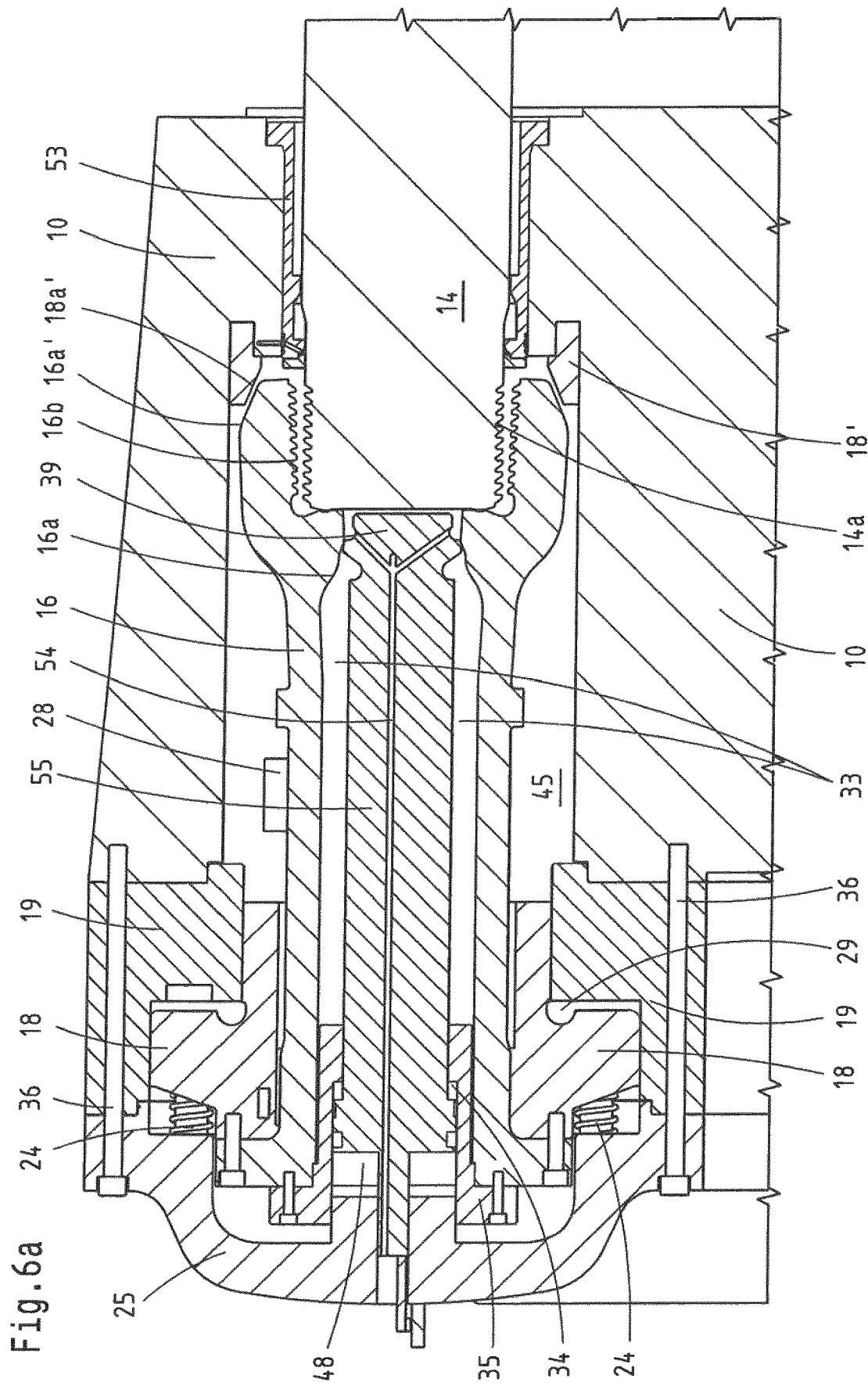
Figure 6B:
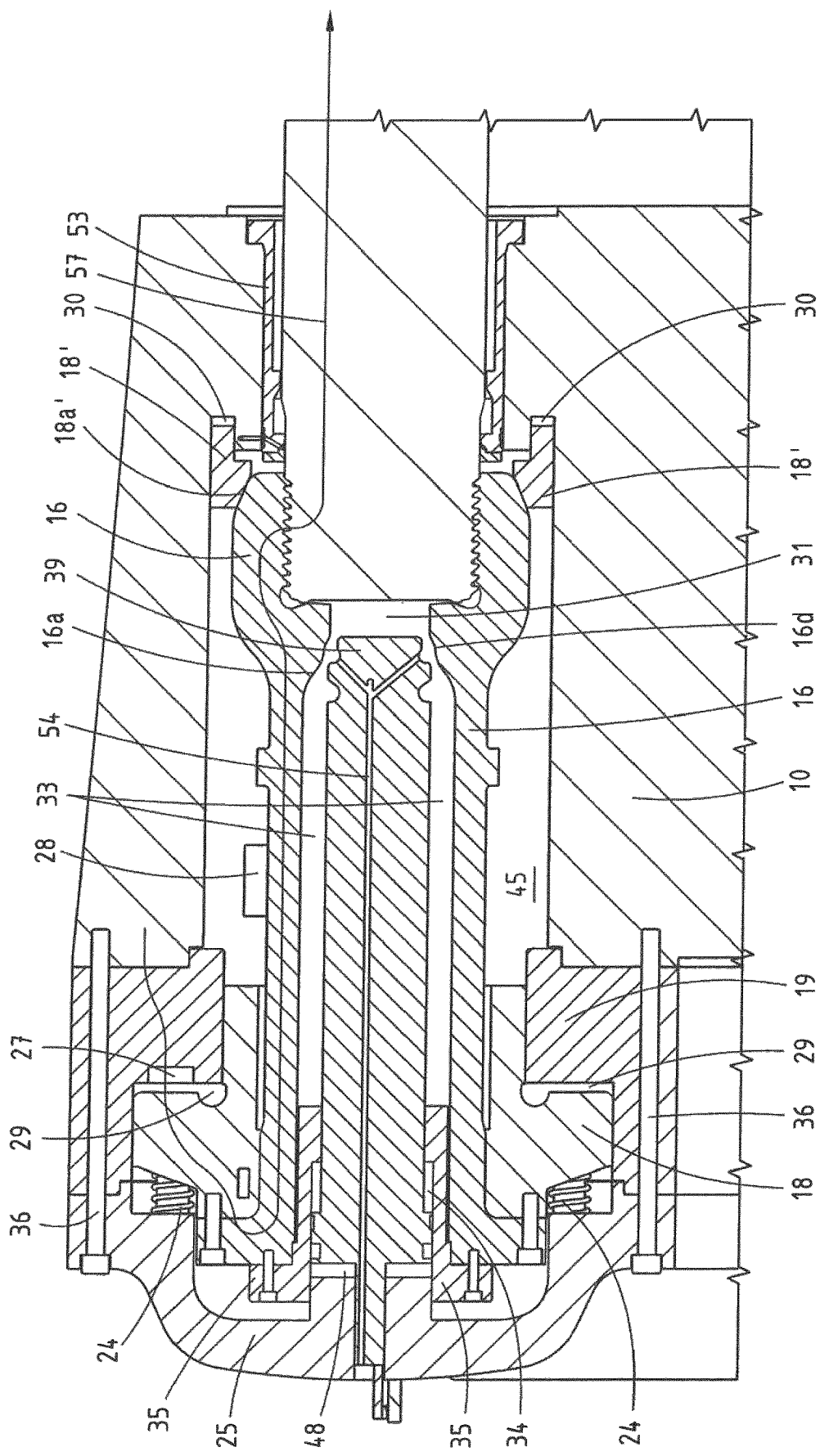

FIGS. 6a, 6b show an alternative, second embodiment of the locking device 15, in which the collet chuck is configured to be actively opening and passively closing. In this exemplary embodiment, the same reference numerals are used as in the first exemplary embodiment in FIGS. 3 to 5b for like parts. Thus, the left-hand side of the Figure here is identical to the first embodiment. In this case too, the piston 18 is configured to be put under load from the cylinder chamber 29, as a high-pressure piston. The piston 18 is mounted to be axially movable in the cylinder 19 and is connected to the collet chuck 16 and the sliding sleeve 35 as a moving unit such that the collet chuck is mounted in floating manner.

However, there is a difference on the right-hand side of FIGS. 6a, 6b. In FIG. 6a, the thrust piece 39 abuts against the collet chuck 16 that is opened in the undeformed condition (actively opening). In this position, the actuable portion 14a can be introduced into the collet chuck 16. However, if fluid is now supplied to the cylinder chamber 34, the unlocking rod 55, together with the thrust piece 39, moves to the left as seen in FIG. 6b, in relation to the collet chuck 16 and the piston 18. At the same time, at the base of the bore 45 of the stationary platen that receives the collet chuck 16, the further piston 18' is moved out of the cylinder chamber 30 and into abutment with the collet chuck 16, to the right as seen in FIG. 6b, such that the cone 18a' comes into abutment against the collet chuck cone 16a' of the collet chuck 16 and thus deforms the collet chuck 16 radially resiliently inwards, with the result that the toothing 16b of the collet chuck 16 engages in the actuable portion 14a of the tie bar 14, and the desired locking is performed (passively closing). The further piston 18' additionally prevents the collet chuck 16 from opening—that is to say from making a radially outward movement of the collet chuck 16—passively, that is to say it is deformed for this purpose. When this locking device opens, the cylinder chamber 30 is relieved of load. The collet chuck 16, which in the locked position is deformed resiliently radially inwards, can then return to its open starting position. This movement may be supported by the thrust piece 39, but in principle the thrust piece is not absolutely necessary for unlocking the locking device in this embodiment.

The exemplary embodiments of FIGS. 1 to 6b have the advantage that, during the injection cycle for manufacturing injection moldings, the tie bars can be moved "freely". This allows unrestricted access where necessary to the mold clamping space R.

Figure 7:
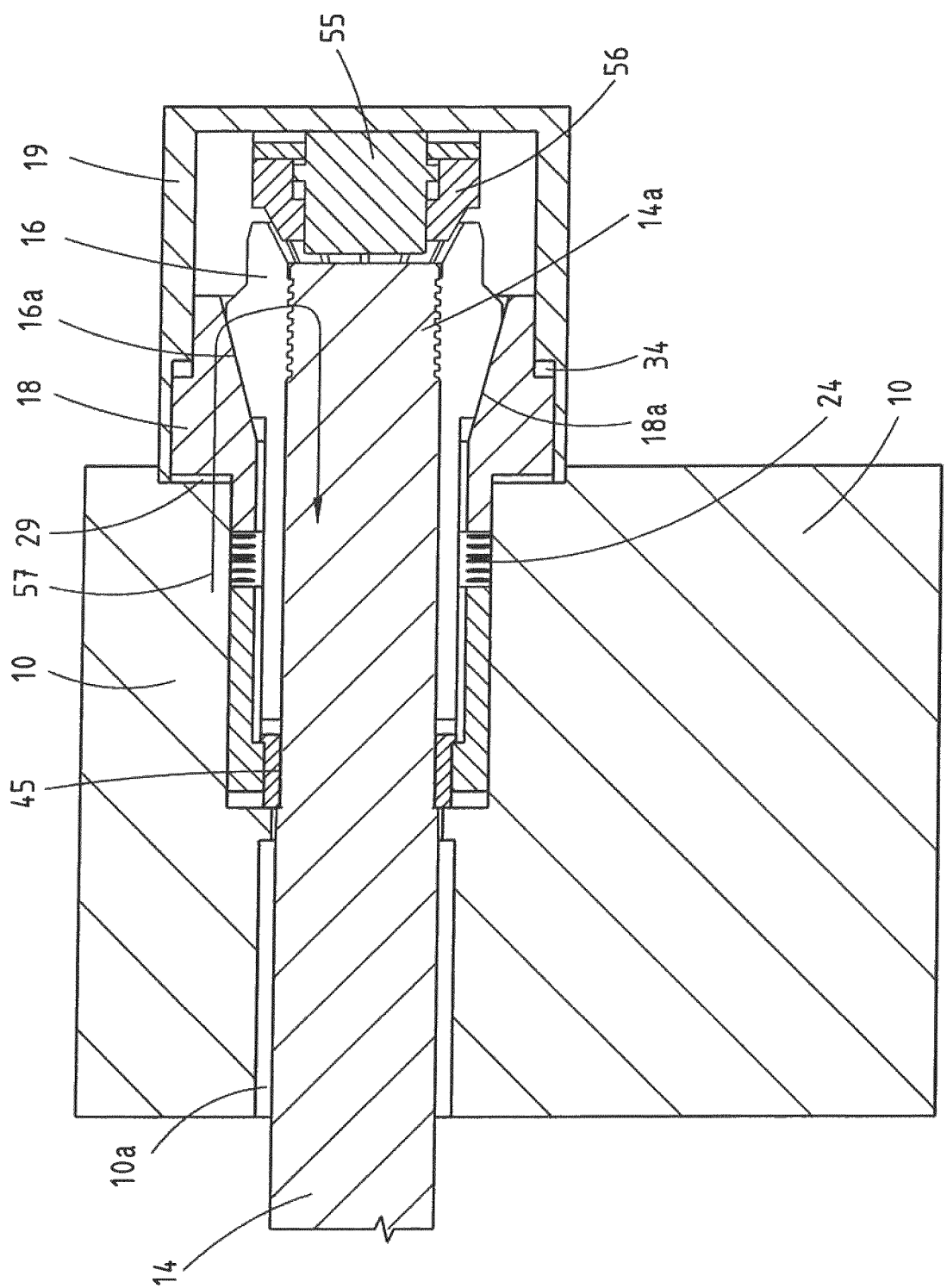
FIG. 7 shows a section through a locking device in a third exemplary embodiment, with an alternative application of the closing force.

FIG. 7 shows, in a third exemplary embodiment, an arrangement in which the closing force is applied in a different way. The actuable portion 14a of the tie bar 14 is introduced into the stationary platen 10 through the receiving bore, from the left as seen in FIG. 7, and the tie bar 14 is guided through the bore 45 as far as the collet chuck 16. At this point in time, the piston 18 is pressed out of the cylinder chamber 34, to the left as seen in FIG. 7, such that the collet chuck can deform resiliently radially outwards. During this, the collet chuck 16 can widen radially resiliently by means of the thrust piece 56 illustrated on the right as seen in FIG. 7. If the pressure in the cylinder chamber 34 falls and/or the thrust piece 56 is moved to the right, the springs 24 press the piston 18 to the right as seen in FIG. 7, such that the cone 18a of the piston comes into abutment against the cone 16a of the collet chuck and presses the collet chuck radially resiliently inwards, with the result that the toothing on the collet chuck 16 and the actuable portion 14a of the tie bar 14 engage in one another in a positively locking manner. In this locked position, the closing force can be applied from the cylinder chamber 29. In this embodiment, the flow of force when the closing force is applied is in accordance with the line 57 extending from the stationary platen 10 through the piston 18 to the collet chuck 16 and through the toothings to the tie bar 14.

If pressure is applied to the cylinder chamber 34, the piston 18 is pressed to the left. The collet chuck 16 is pushed into the home position by way of the springs 24. In this position, there is a gap in the cone region formed by the collet chuck 16 and the piston 18. The thrust piece 56 can spread the collet chuck, which clears the free space for the tie bar (force transmitting element) to move into.

If the thrust piece 56 moves back out, the collet chuck 16 closes and locking is performed between the actuable portion 14a and the toothing 16b. As the force builds up, the cylinder chamber 29 is put under load, and the piston 18 advances and pushes the collet chuck to the right by way of the cone 18a and 16a, generating the high pressure. The advantage of this variant is that, in accordance with the line 57, the flow of force does not pass through the whole collet chuck but directly from the piston cone 18a to the collet chuck cone 16a and from there through the toothing to the tie bar (less load on the collet chuck structural part).

FIGS. 10 to 14 show a further, fourth exemplary embodiment of the locking device 15, in which the collet chuck 116 takes a form in multiple parts and has clamping elements that are mounted in articulated manner. In principle, the reference numerals used in this and in the next, fifth exemplary embodiment are the same as in the first three embodiments, except that in these embodiments they are increased by 100.

Figure 10:
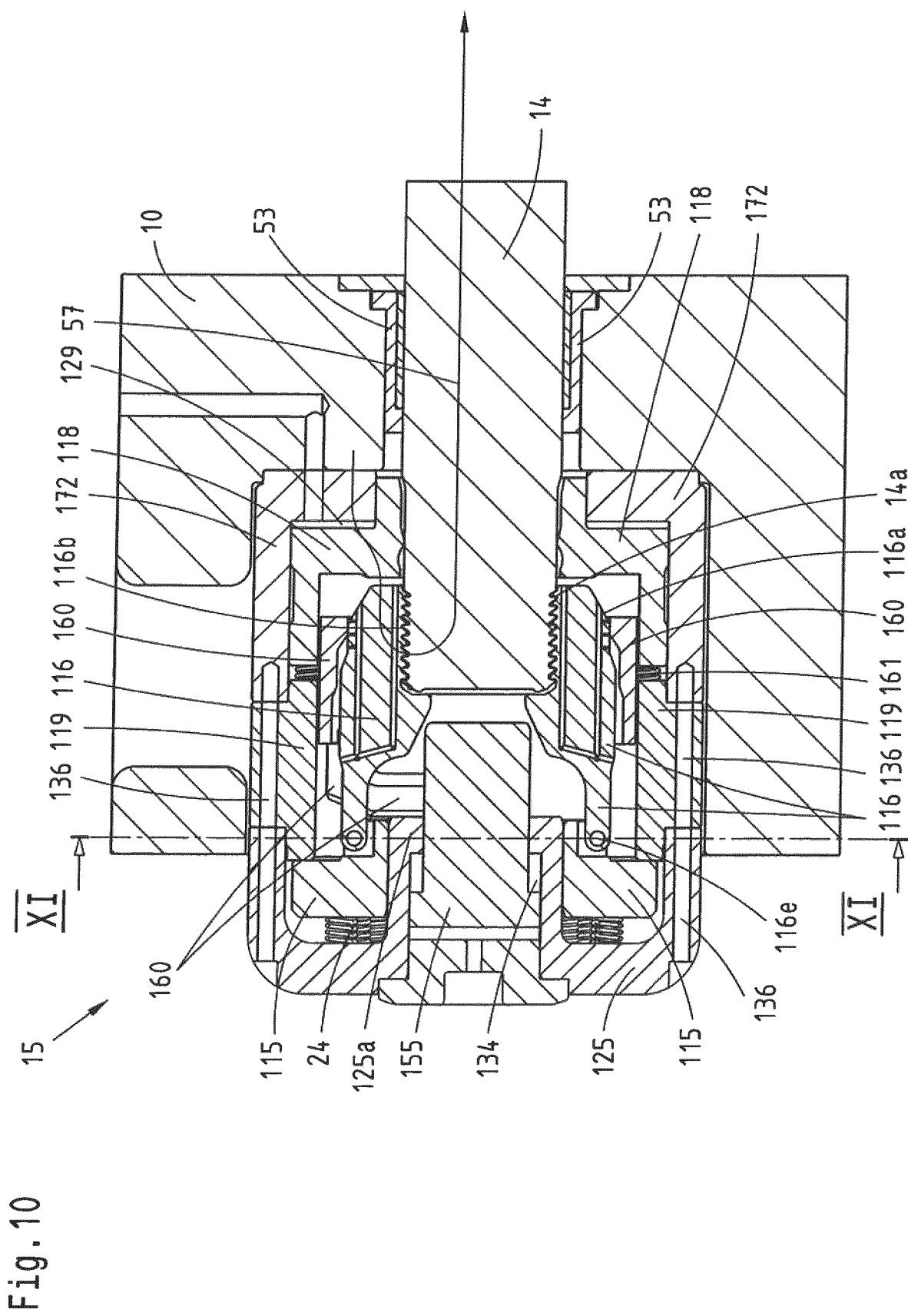
FIG. 10 shows a section through a locking device in a fourth exemplary embodiment, with an articulated mounting of clamping elements.
Figure 12:
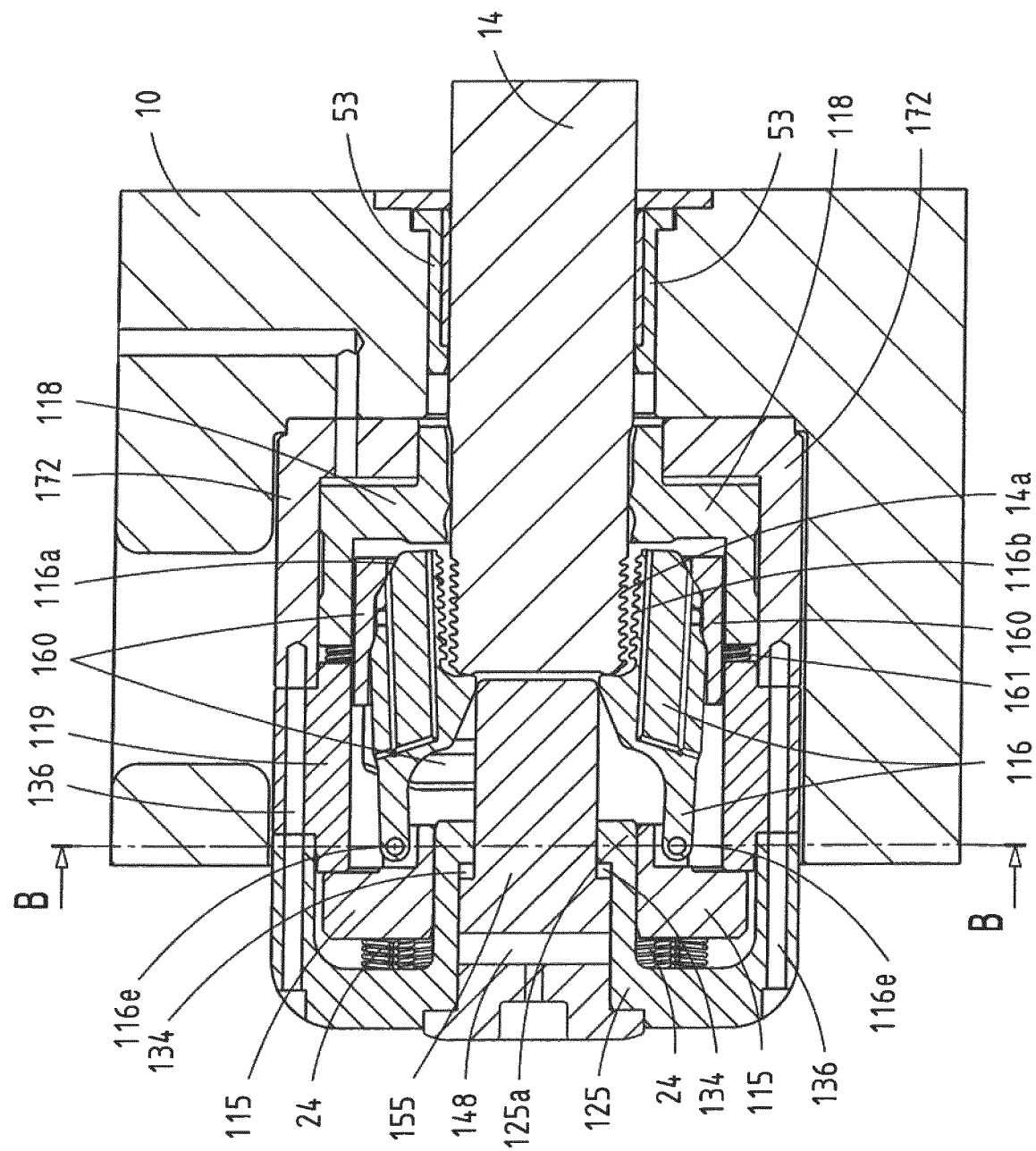
FIG. 12 shows a view according to FIG. 10, through the locking device, with the clamping elements open.

FIGS. 10 and 12 show the construction of the platen, in particular the stationary platen 10, in which a force transmitting element in the form of a tie bar 14 is detachably received in a mounting bushing 53. The tie bar 14 has an actuable portion 14a in the form of a toothing, at its end located in the centre as seen in FIG. 10. Attached to the stationary platen 10 is the locking unit 15, which includes a mounting piece 172 that penetrates into the bore in the stationary platen and to which the cylinder 119 and the cylinder cover 125 of the locking device 15 are attached by way of attaching devices 136. The mounting piece 172 at the same time forms the cylinder in which the piston 118 is received. The mounting piece 172 itself is likewise attached by way of attaching elements to the stationary platen 10—that is to say the self-contained assembly comprising the locking device 15 can be attached by way of these attaching devices to the stationary platen 10, which in particular facilitates the manufacture and maintenance of the injection molding machine.

The cylinder cover 125 has an integrally formed element 125a in which there is received an unlocking element 155 comparable with the unlocking rod 55 in the first two embodiments. A comparison between FIGS. 10 and 12 makes it clear that the unlocking element 155 can be moved to the left as seen in FIG. 10 by applying pressure in the cylinder chamber 134, and to the right as seen in FIG. 12 by applying pressure in the cylinder chamber 148.

Figure 13:
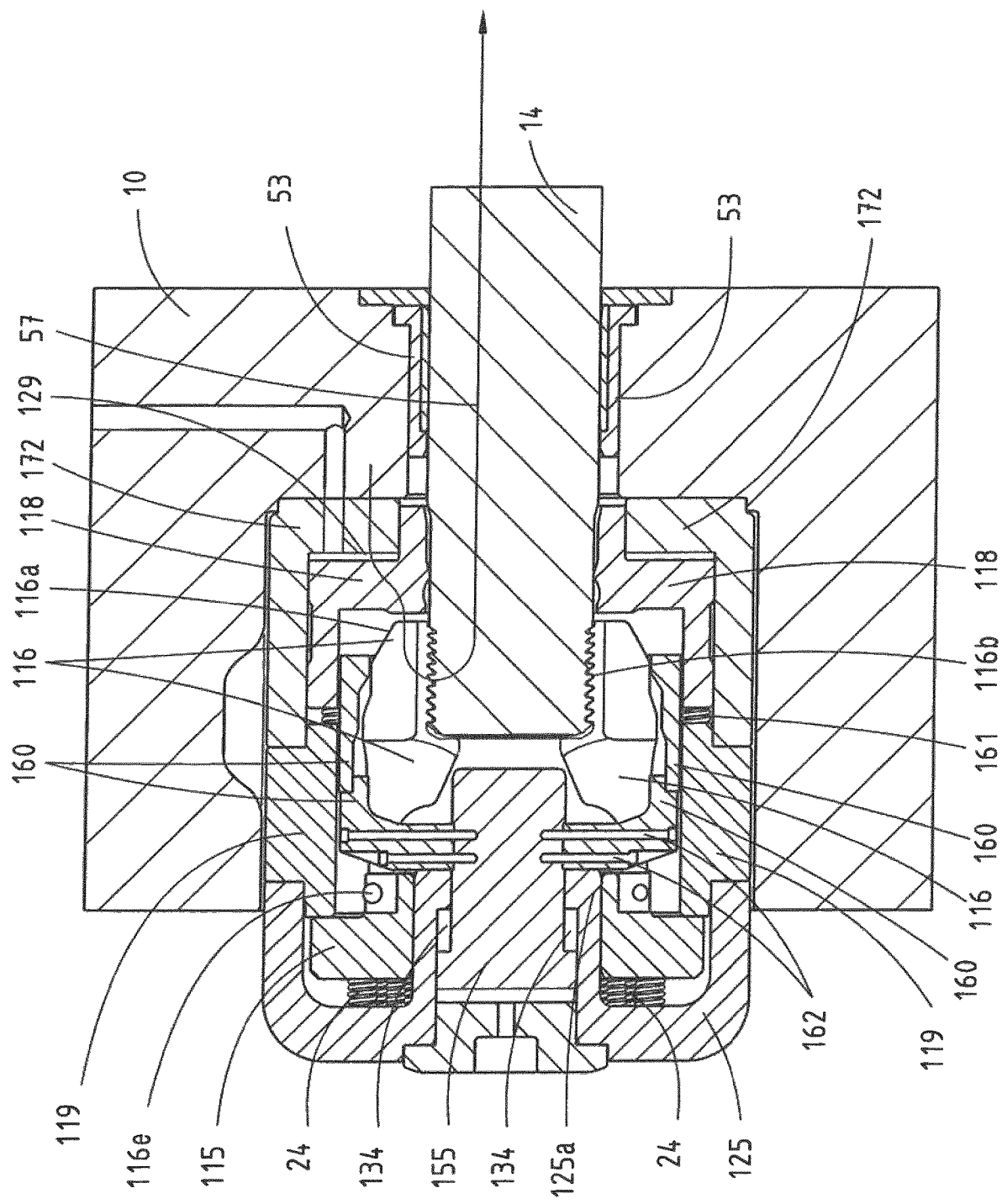
FIGS. 13, 14 show a section along the line XIII-XIII in FIG. 11, through the locking device, with the clamping elements closed and open respectively.
Figure 14:
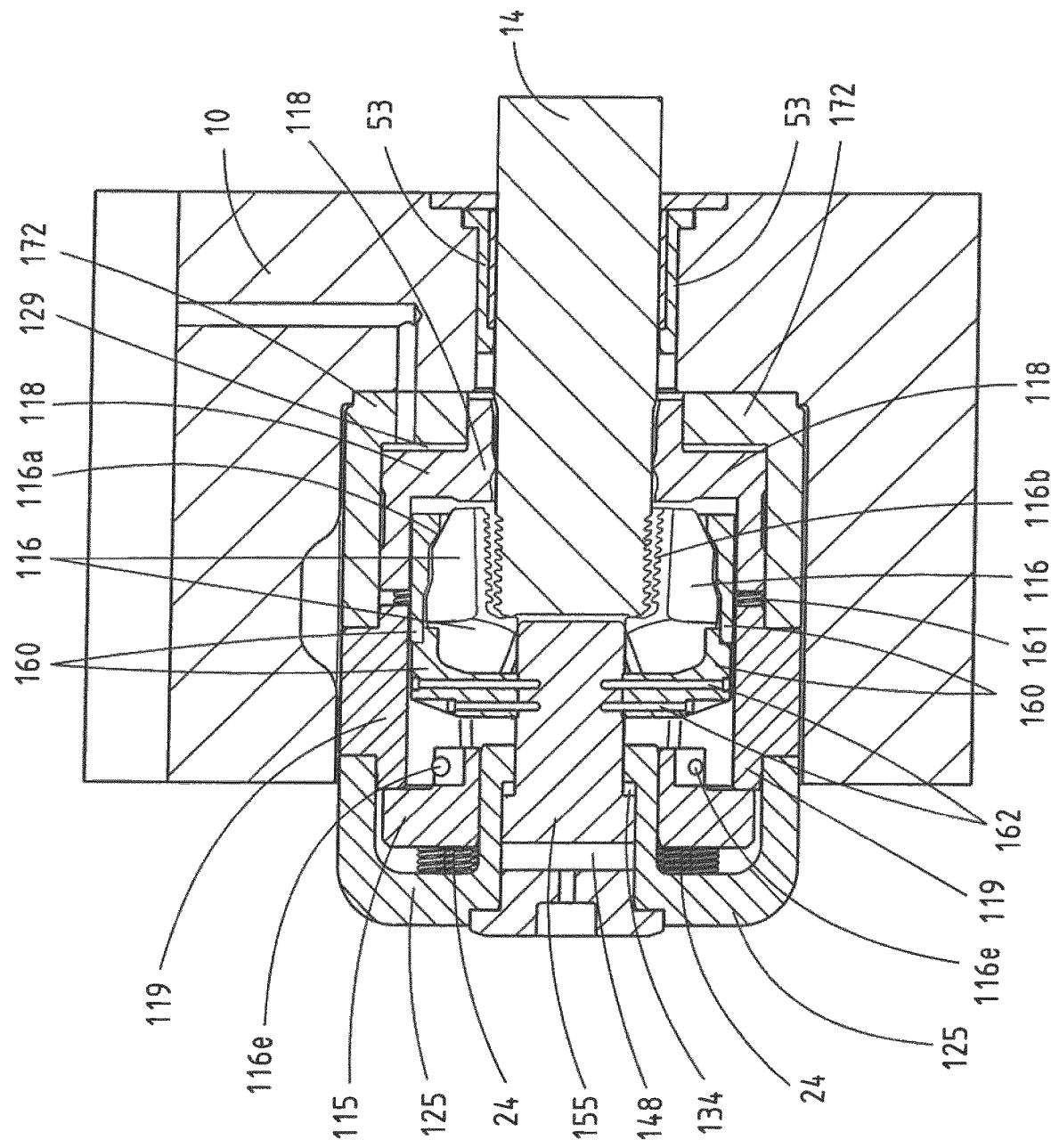

Connected to the unlocking element 155 by way of attaching devices according to FIG. 13 is an actuation element 160, which according to FIG. 14 is guided radially outwards as far as the cylinder wall of the cylinder 119. When the unlocking element 155 is actuated, this actuation element 160 is moved in the axial direction of the force transmitting element, wherein when the unlocking element 155 is moved to the right, out of the position in FIG. 10 and into the position according to FIG. 12, the actuation element 160 is also moved to the right. This actuation is performed relative to the collet chuck or clamping elements 116, which for their part are mounted on the mounting element 115 by way of the joint 116e that is arranged transversely to the closing direction. The mounting element 115 is for its part in turn supported in the direction of the cylinder cover 125 by a resilient element in the form of the spring 24, and is otherwise supported radially on the integrally formed element 125a. This mounting element 115 is guided movably on the outer side of the integrally formed element 125a of the cylinder cover 125, in opposition to the force of the spring 24.

FIG. 10 shows the clamping elements 116 in the closed condition—that is to say the toothing 116b engages in the actuable portion 14a of the tie bar 14. This position is achieved in that, as a result of applying pressure in the cylinder chamber 134, the unlocking element 155 moves to the left as seen in FIG. 10 until it abuts, and has consequently moved the actuation elements 160 that are connected thereto to the left as seen in FIG. 10. This has the result that, from the collet chuck cone 116a, the actuation element 160 comes into abutment with the outer side of the clamping element 116 and moves it into the position according to FIG. 10. If, in this locked position, pressure in the cylinder chamber 129 is applied to the piston 118, it moves in opposition to the force of the resilient element 161 and thus has the effect that as soon as the piston 118 comes into abutment against the clamping element the closing force is applied. In order to bring the clamping element 116 out of operative engagement with the force transmitting element, pressure is applied in the cylinder chamber 148. This has the result that the unlocking element 155 is moved to the right as seen in FIG. 12, with the actuation element 160 also moving to the right and hence creating a free space for movement of the clamping element 116. At the same time, the end-face region of the unlocking element 155 likewise comes into abutment against the radially inside end of the clamping element 116, and hence presses the clamping elements out of engagement with the actuable portion 14a of the force transmitting element. Once pressure is reduced in the cylinder chamber 129, the resilient element 161 presses the piston 118 back into the starting position.

Advantageously, the stroke of the unlocking element 155 creates a forcibly controlled opening and closing movement of the collet chuck 116. Moreover, high-pressure opening with the aid of the unlocking element 155 acting on the tie bar 14 is also possible in this embodiment if necessary.

Figure 11:
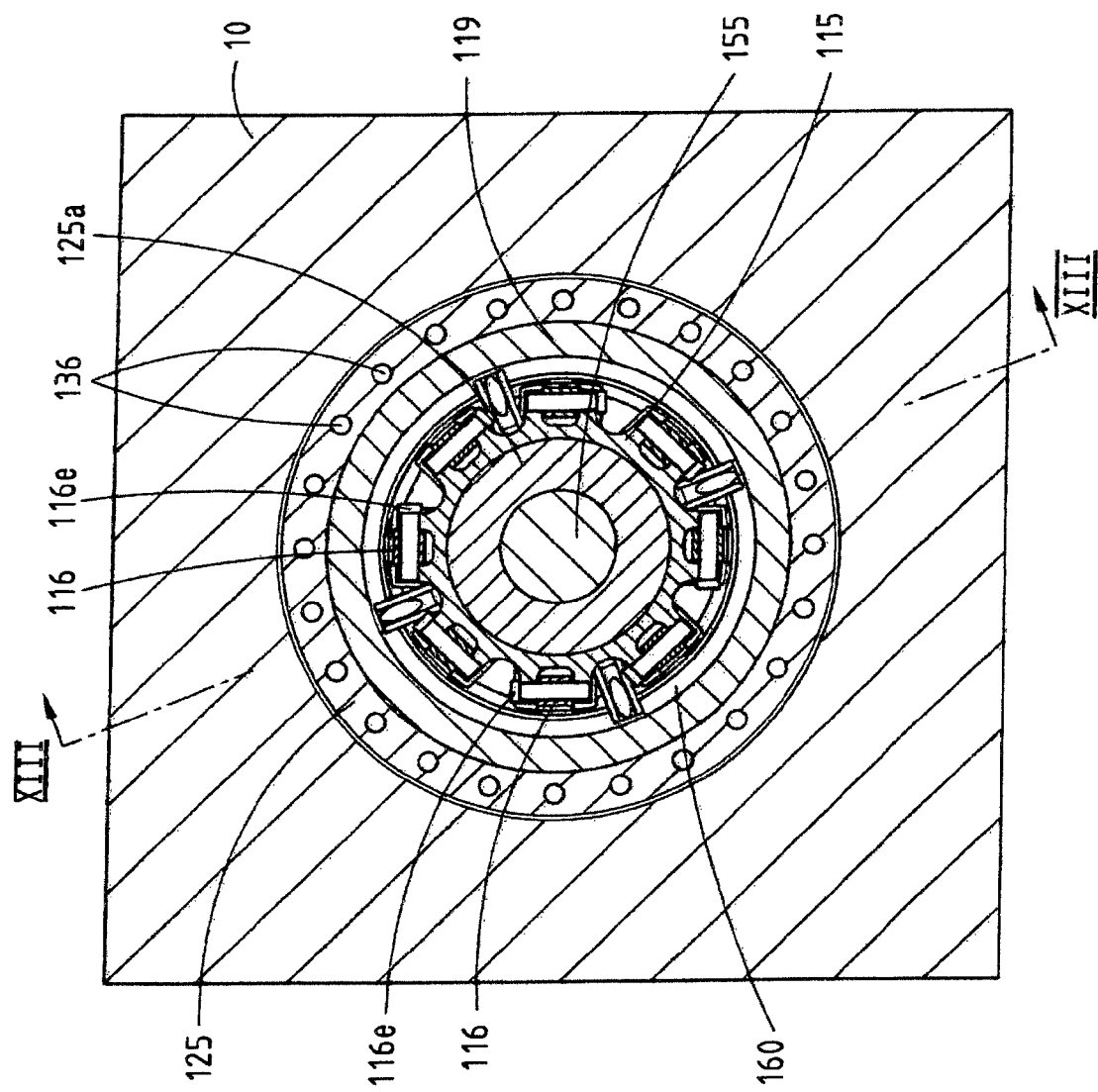
FIG. 11 shows a section along the line XI-XI in FIG. 10, through the locking device, with the clamping elements open.

FIG. 11 shows a corresponding section through the arrangement in the closed condition, along the line XI-XI in FIG. 10. It should be noted that a plurality of clamping elements and actuation elements are provided, each supported at an angle of 90 degrees in the exemplary embodiment, and are arranged radially in relation to the unlocking element 155 in the centre. The supports and the actuation element 160 are coupled, for example screwed, to the unlocking element 155. These elements are guided by way of the unlocking element 155. FIGS. 13 and 14 show the attachment of the actuation elements 160 to the unlocking element 155, wherein in this section the clamping elements 116 are not shown in section.

The flow of force passes directly from the piston 118 through the toothing 116b and into the actuable portion 14a and hence into the force transmitting elements. This results in a simple introduction of force with optimized clamping load on the clamping element 116 simply by the transmission of a thrust force.

Figure 15:
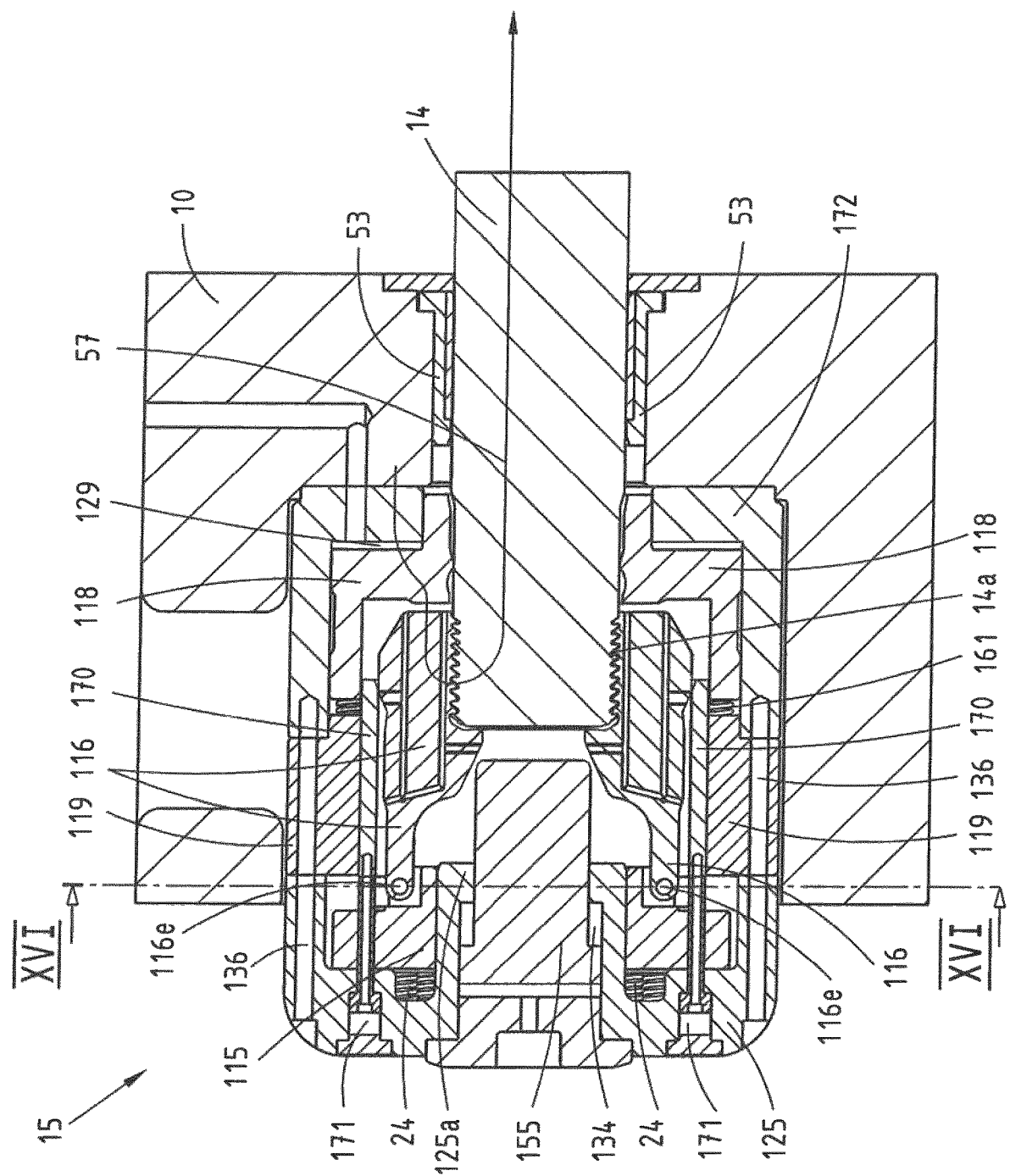
FIG. 15 shows a section through a locking device in a fifth exemplary embodiment, with the clamping elements closed and movable in rotation, and with a cylinder-actuated sliding sleeve.
Figure 16:
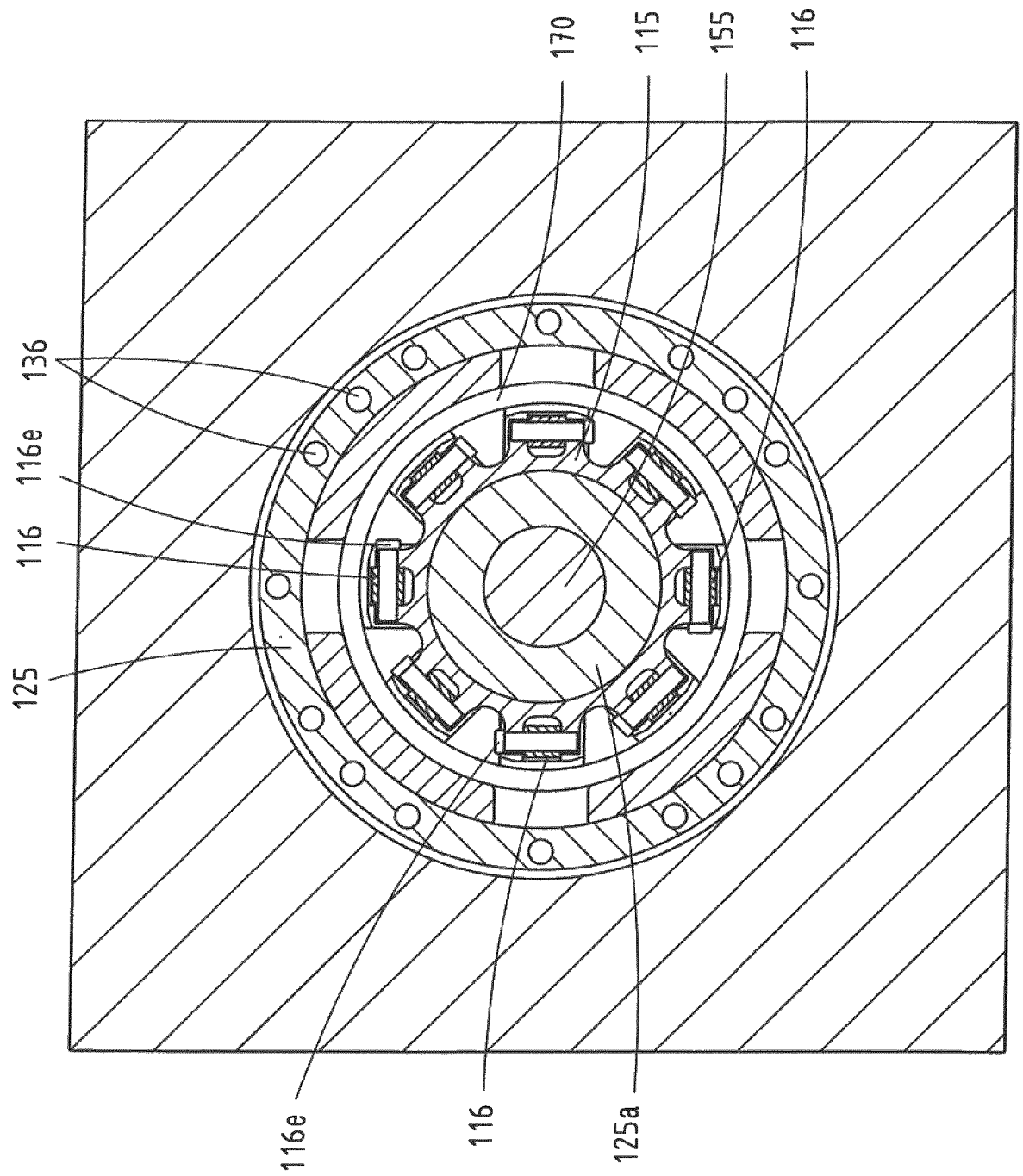
FIG. 16 shows a section along the line XVI-XVI in FIG. 15, though the locking device.
Figure 17:
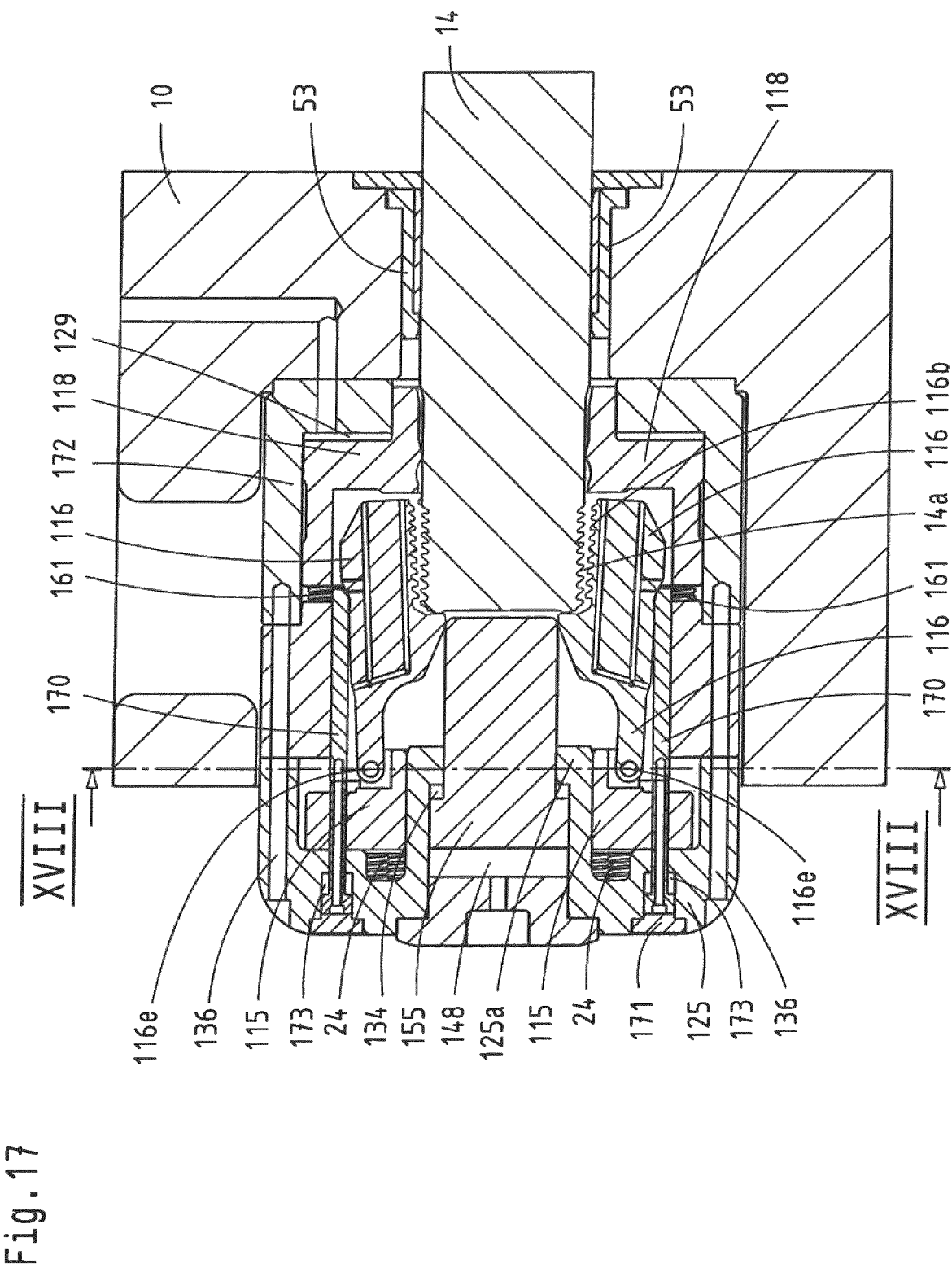
FIG. 17 shows a section through the locking device according to FIG. 15, with the clamping elements open.
Figure 18:
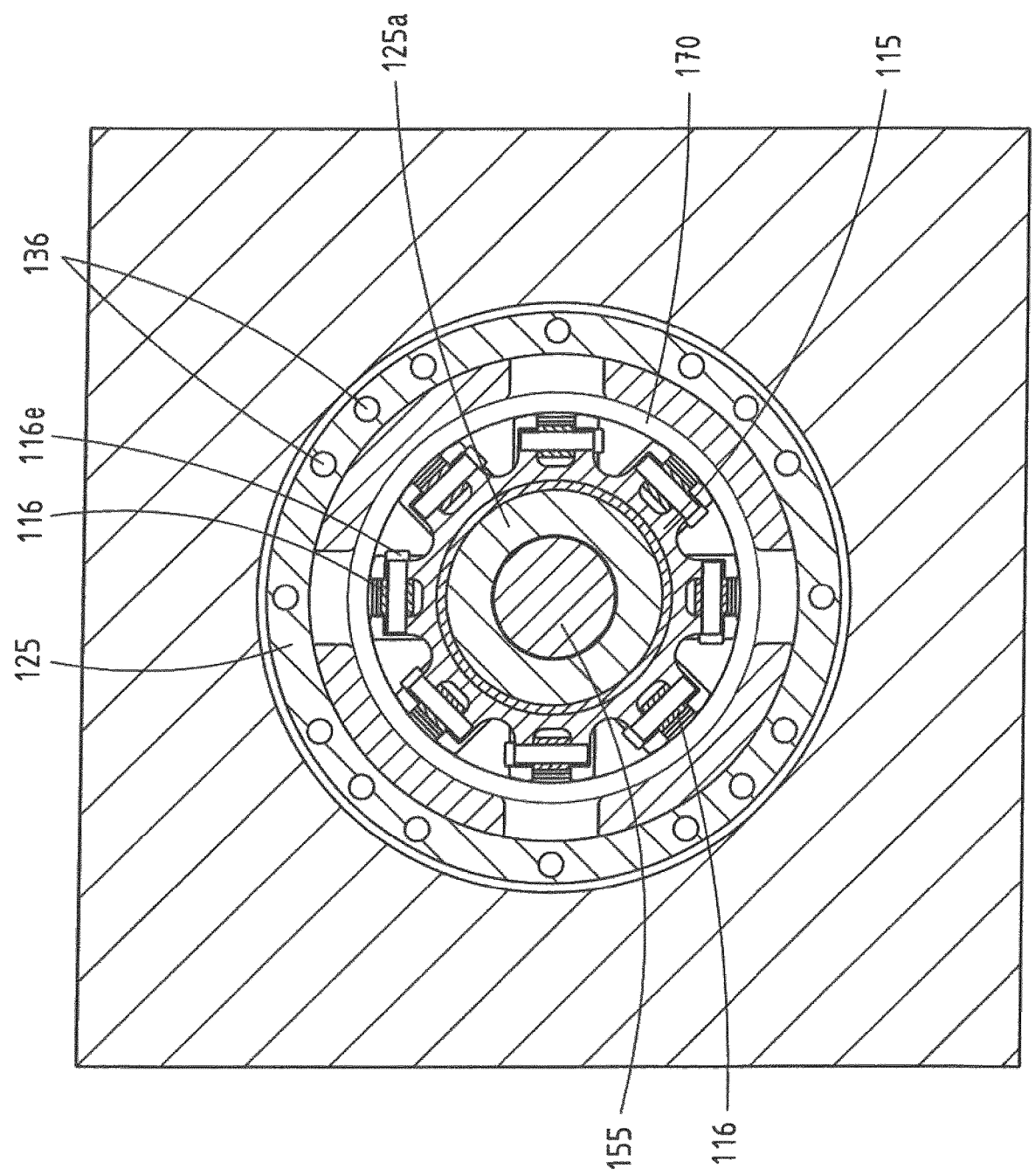
FIG. 18 shows a section along the line XVIII-XVIII in FIG. 17, through the locking device.

In principle, the fifth exemplary embodiment, in FIGS. 15 to 18, shows a construction comparable with the fourth exemplary embodiment, and for this reason the same reference numerals are used to a very great extent. Looking at the closed position of the locking device according to FIG. 15 and the open position according to FIG. 17, it can be seen that in this embodiment, in contrast to the example in FIG. 10, no actuation element 160 is used. Although the arrangement of the tie bar 14 in the platen 10 and the mounting piece 172, cylinder 119, cylinder cover 125 and unlocking element 155 are the same, and the clamping elements 116 are also arranged in principle in a comparable manner by way of their joint 116e, a sliding sleeve 170 is additionally provided, and a load can be applied thereto from the cylinder chamber 171, so it is configured to be moved from the position on the left as seen in FIG. 17 to the position on the right as seen in FIG. 15. The springs 161 press the piston 118 into the end position so that the clamping element 116 can open freely. In the closed, locked position of the locking device according to FIG. 15, the unlocking element 155 is moved to the left as a result of pressure in the cylinder chamber 134. As a result, first of all in front of the unlocking element 155 there is a free space into which the radially inner surfaces of the clamping elements 116 can penetrate. At the same time, and independently of any other mechanism, pressure in the cylinder chamber 171 can move the sliding sleeve 170 to the right as seen in FIG. 15, so that it comes into abutment against the outer side of the clamping element 116, with the result that the clamping element 116 is fixed in the locked position by the sliding sleeve 170. As a result, engagement of the toothing 116b in the toothing of the actuable portion 14a is ensured. In this position, once again pressure from the cylinder chamber 129 can be applied to the piston 118 for the purpose of generating the closing force. Here, the mounting element 115 on which the clamping element 116 is mounted by way of the joint 116e is mounted axially—that is to say movably in the direction of the force transmitting element—only in opposition to the force of the spring 24. There is a hard abutment, to the right as seen in FIG. 15, against the piston 119. The springs 24 press the mounting element 115 (together with the clamping elements 116) to the right in the hydraulically unloaded condition, into abutment against the piston 119. In this way, a theoretically optimum joining position between the force transmitting element (tie bar 14) and the clamping element 116 is always achieved. If the force transmitting element enters the clamping element 116 with an "overshoot" (for example because the mold height has been set incorrectly), the springs 24 damp the load of impact and thus protect the structural parts.

For the purpose of unlocking the locking device according to FIG. 15, according to FIG. 17 pressure in the cylinder chamber 148 is applied, as a result of which the unlocking element 155 is moved to the right as seen in FIG. 17. It then where appropriate comes into abutment by means of its end face against the tie bar 14, with the result that high-pressure opening becomes possible as a result of further pressure in the cylinder chamber 148, as already described in connection with the other embodiments. At the same time, the unlocking element 155 in the position according to FIG. 17 has already driven the radially inner ends of the clamping elements 116 radially outwards, resulting in a position of the clamping elements 116 at a spacing from the tie bar 14. However, this is only possible because at the same time the cylinder-actuated sliding sleeve 170 has likewise been moved to the left as seen in FIG. 17 by pressure in the cylinder chamber 173, such that the sliding sleeve 170 comes to lie at the outer side of the clamping element 116, in a corresponding free space.

In principle, the construction in the embodiments ensures that once the collet chuck 116 is locked the further flow of force is substantially only through the collet chuck cones 16a, 18a' and the associated mating cones, with the result that the collet chuck 16 itself is usually uncoupled from the flow of force when the closing force is applied. In the embodiment of FIGS. 3-6, the flow of force goes through the collet chuck and consequently results in a high clamping load in the structural part, which requires a significantly more complex configuration of the elements. In the embodiment of FIGS. 10-18, by contrast, the flow of force is introduced into the collet chuck purely as a thrust load, which contributes to a smaller load on the elements. In this case the flow of force passes from the piston 118 through the vertical abutment face and into the clamping element 116, and from there through the toothing and into the force transmitting element.

Figure 9A:
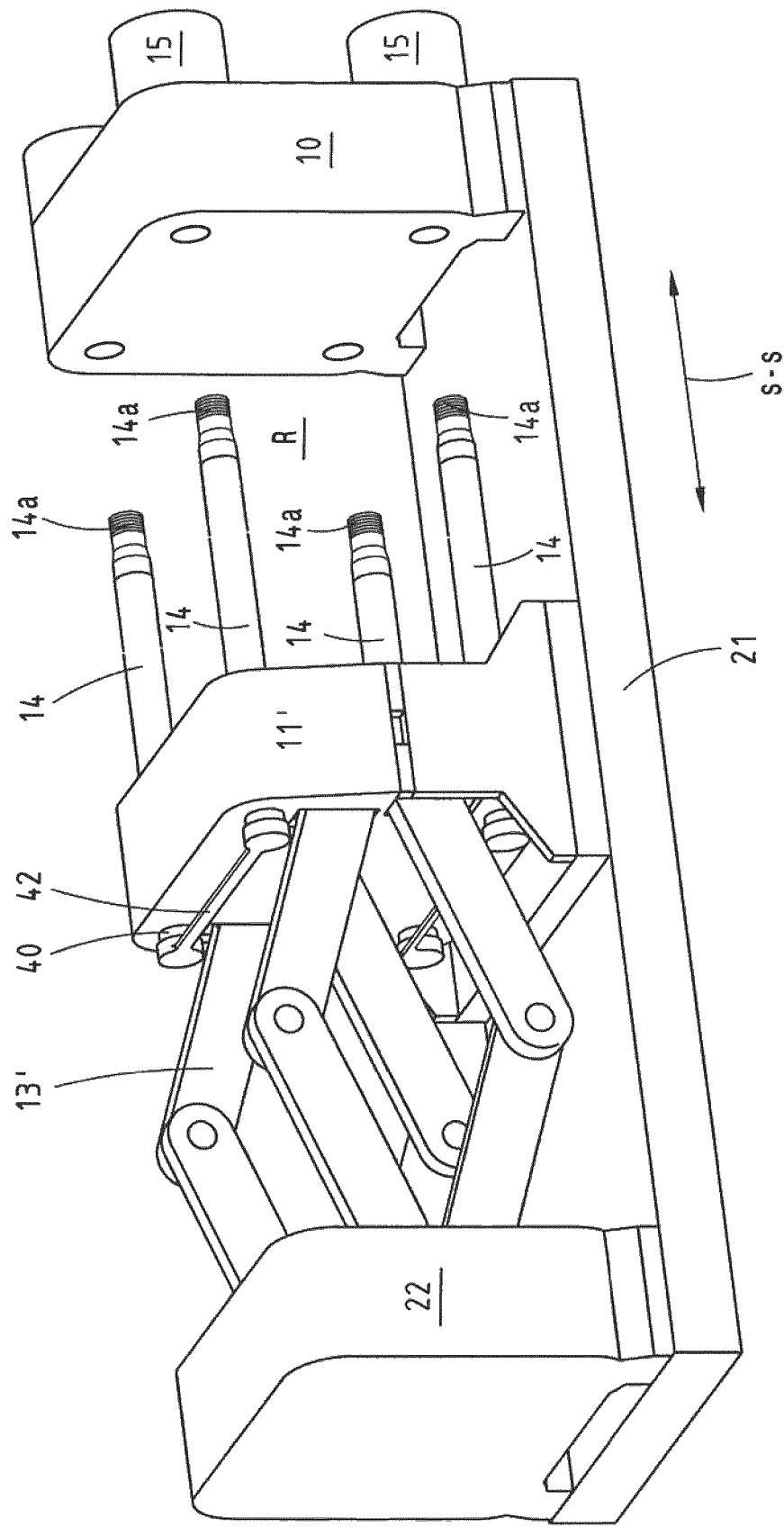
FIGS. 9*a*, 9*b* show alternative embodiments of the mold closing unit on a three-plate machine, in a three-dimensional illustration.
Figure 9B:
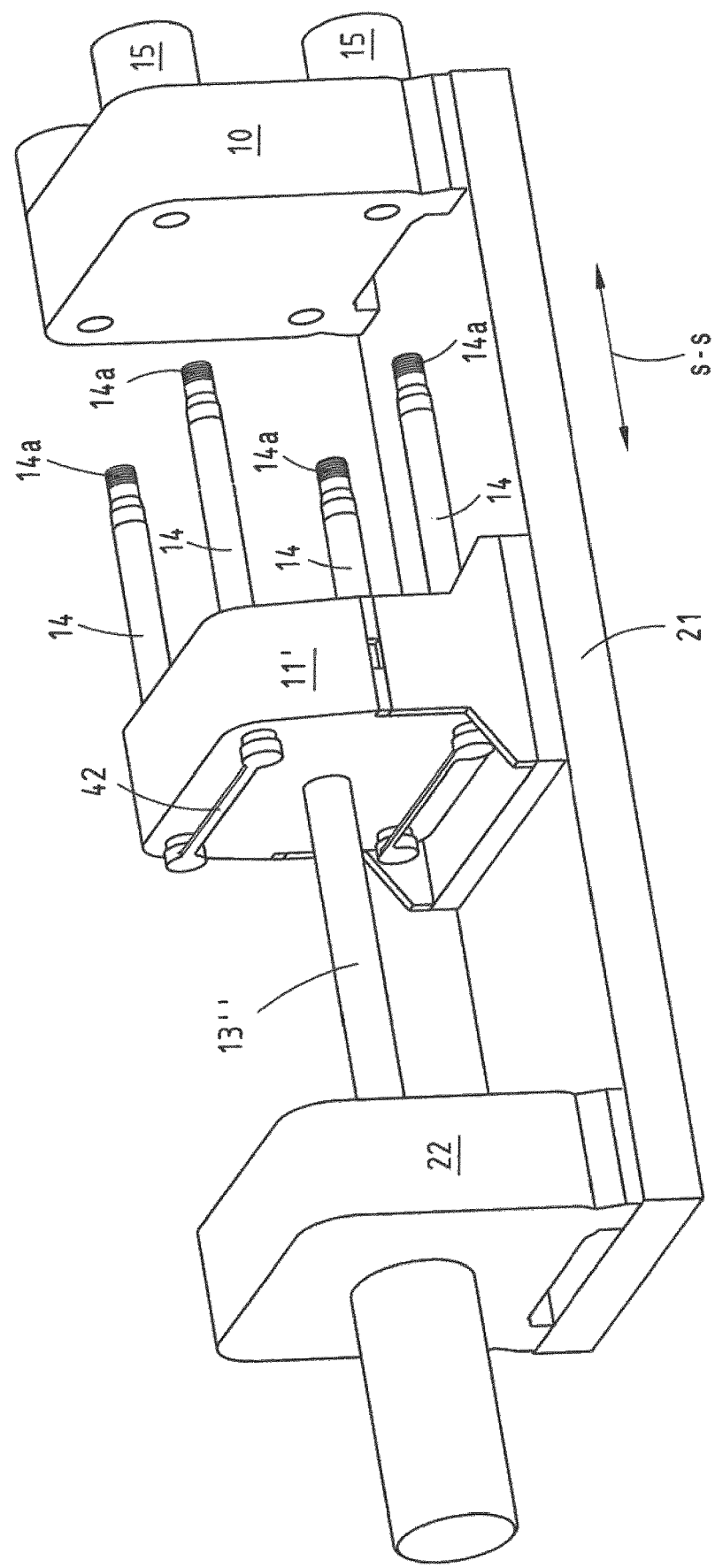

While the exemplary embodiments above show the mold closing unit of a two-plate machine, FIGS. 9a, 9b illustrate exemplary embodiments on a three-plate machine. Unlike the embodiments above, in a three-plate machine a supporting element is provided against which the mold moving device 13', 13" is supported. The mold moving device 13' in FIG. 9a is a toggle mechanism, and the mold moving device 13" in FIG. 9b is a hydraulic drive unit. The closing force is preferably applied by itself or is supplemented by the piston-cylinder unit in the locking device 15.

According to the method, in all the exemplary embodiments the collet chuck is mounted in a floating arrangement. When the parts of the injection mold M are in the mold closure position, the actuable portion 14a of the force transmitting element is positively locked to one of the platens 10, 11, 11' by means of the locking device 15. In this locked condition, the closing force is then transmitted by way of the force transmitting element. The force transmitting element is mounted in a floating arrangement by means of the at least one collet chuck, in which case usually a plurality of force transmitting elements are provided on the respective platen, so a corresponding number of collet chucks 16, 116 is provided. The collet chuck 16, 116 mounted in a floating manner is at the same time connected, within the locking device, to a piston 18, 118 of a piston-cylinder unit 17 in order to apply the closing force. As a result, both locking and also the application of the clamping force can be executed from a single assembly, such that even at high forces reliable and rapid generation of the closing force is possible.

The collet chuck 16, 116 is forcibly guided and locked to the force transmitting element, wherein a high pressure is generated in the locked condition by means of the piston 18, 118 for the purpose of generating the closing force. For the purpose of forcible guidance, the collet chuck 16 is actuable by means of a thrust piece 39 in the first two exemplary embodiments. The thrust piece is arranged on an unlocking element that is central in relation to the collet chuck and takes the form of the unlocking rod 55, and on actuation the thrust piece results in radially resilient deformation of the collet chuck 16.

The piston 18 for generating the closing force is movable by way of the collet chuck 16, together with at least one mounting 35 formed by a sliding sleeve, on an unlocking rod arranged centrally in the collet chuck 16 and in the form of an unlocking element. This ensures guidance on the one hand of the piston 18 and also of the unlocking rod 55. However, the unlocking element 55, 155 is also movably guided in that it is supported substantially on the cylinder 25, 125, either directly or indirectly. The components are mounted from the outside in. The unlocking element is guided in the sliding sleeve 35, and the plain bushing is supported on the cylinder 19 by way of the collet chuck 16 and the piston 18. In the first two embodiments, there is provided for this purpose a sliding sleeve 35, along which the unlocking element 55 moves. In the last two embodiments according to FIGS. 10 to 18, the cylinder cover 125 has an integrally formed element 125a along which the unlocking element 155 is movably guided in relation to the cylinder cover 125.

In principle, the locking device may be configured to be actively closing or actively opening. In the embodiment of FIGS. 3, 4 the collet chuck 16 is actively closing—that is to say that in the undeformed condition, when the actuable portion 14a of the force transmitting element is in the appropriate position there is an operative engagement between the toothing 16b of the collet chuck and the toothing of the tie bar 14. In the radially resiliently deformed and hence passively opened condition, the collet chuck 16 has a receiving opening into which the actuable portion 14a of the force transmitting element is introduced. Once the actuable portion 14a has been introduced, radial deformation of the collet chuck 16 is reversed and so the collet chuck is connected to the force transmitting element with active closing and detachably, but at the same time with positive engagement. As an alternative, however, in the second embodiment of FIGS. 6a, 6b the collet chuck 16 may also be configured such that it is radially undeformed in the open condition. The tie bar 14 can again be introduced into the receiving opening that is then present. Then, the collet chuck 16 is radially inwardly resiliently deformed and so the collet chuck 16 is connected to the force transmitting element with passive closing and detachably, but at the same time with positive engagement.

In a solution according to the fourth and fifth embodiments, there is no radial deformation of the collet chuck 116. Rather, the collet chuck 116 is configured to be in multiple parts, and has clamping elements that are mounted to rotate transversely to the direction of closing. These clamping elements are mounted on a mounting element 115 and are controlled to move into and out of operative engagement with the force transmitting element, either by means of an actuation element 160 connected to an unlocking element 155 (FIGS. 10 to 14) or by means of a sliding sleeve 170 that is actuable independently of the collet chuck (FIGS. 15 to 18).

Preferably, the unlocking element 55, 155 in the exemplary embodiments has a dual function. On the one hand, it is acted upon from a cylinder chamber 48, 148 for the purpose of opening the collet chuck 16, 116. On the other, it is arranged such that in the open condition of the collet chuck it comes into abutment with the end face of the unlocking element 155 against a tie bar 14 configured as a force transmitting element. In this position, if there is a further build-up of pressure in the cylinder chamber 48, 148, the injection mold M may where appropriate be opened under high pressure.

It goes without saying that this description may be subject to the most diverse modifications, changes and adaptations which are within the range of equivalents to the attached claims.

The invention claimed is:

1. A mold closing unit for an injection molding machine for processing plastics and other plasticisable materials, comprising
   a stationary platen, p1 a movable platen which is movable in relation to the stationary platen and which forms a mold clamping space between the movable platen and the stationary platen for the purpose of receiving injection molds, and which is movable along a closing direction, for closing and opening the injection mold,
   a mold moving device configured to move the movable platen into and out of mold closure of parts of an injection mold that is received between the platens,
   at least one force transmitting element, which is connected to one platen of the movable platen or the the stationary platen and, at its end spaced from the one platen, has an actuable portion that is associated with the other platen of the movable platen or the stationary platen and is actuable for an operative engagement,
   at least one locking device that is associated with the other platen and is movable into positive operative connection with the actuable portion when the parts of the injection mold are in a mold closure position, for the purpose of applying a closing force,
   wherein the at least one locking device comprises at least one floating collet chuck that is movable into positive operative connection with the actuable portion for the purpose of locking the at least one force transmitting element and the other platen during mold closure, and at the same time is connected to at least one piston of a piston-cylinder unit configured to apply the closing force,.
   wherein the locking device comprises at least one unlocking element that is arranged in the at least one collet chuck and a cylindrical chamber that is configured to put the unlocking element under load for the purpose of opening the collet chuck, and
   wherein when the unlocking element abuts by its end face against the tie bar, high-pressure opening of the injection mould is configured to be generated from this cylindrical chamber.

2. A mold closing unit according to claim 1, wherein the at least one collet chuck and the piston are parts of a self-contained assembly.

3. A mold closing unit according to claim 1, wherein the at least one collet chuck is forcibly lockable to the at least one force transmitting element, and in a locked condition the at least one piston is configured to generate a high pressure for generating the closing force.

4. A mold closing unit according to claim 1, wherein the at least one piston is actuable in opposition to the force of resilient elements.

5. A mold closing unit according to one claim 1, wherein the at least one unlocking element comprises at its end adjacent to the positive operative connection a thrust piece which, when it abuts against the at least one collet chuck, is configured to cause a radial resilient deformation of the collet chuck in a locked position.

6. A mold closing unit according to claim 5, wherein the at least one unlocking element is guided on and relatively movable to a cylinder cover, within a sliding sleeve as a mounting or within an integrally formed element as a mounting.

7. A mold closing unit according to claim 1, wherein, in a radially resiliently deformed open condition, the at least one collet chuck, which is mounted such that it is axially movable on the platen by way of a cylinder for the at least one piston, comprises a receiving opening for the purpose of introducing a-the actuable portion of the force transmitting element that is actuable by the at least one collet chuck.

8. A mold closing unit according to claim 7, wherein, with active closing, in a radially undeformed condition the at least one collet chuck engages by means of a toothing in a toothing of the actuable portion.

9. A mold closing unit according to claim 5, wherein a sliding sleeve that is radially attached to the unlocking element is provided and in a radially undeformed condition of the at least one collet chuck comes into abutment with an abutment region of the at least one collet chuck, for securing the collet chuck to prevent radial opening.

10. A mold closing unit according to claim 1, wherein, in a radially undeformed open condition, the at least one collet chuck, which is mounted such that it is axially movable on a platen by way of a cylinder for the at least one piston, comprises a receiving opening for the purpose of introducing an actuable portion of the force transmitting element that is actuable by the at least one collet chuck (16).

11. A mold closing unit according to claim 10, wherein, with passive closing, in a radially resiliently deformed condition, a toothing of the at least one collet chuck engages in a toothing of the actuable portion.

12. A mold closing unit according to claim 11, wherein, in the radially resiliently deformed condition, the at least one collet chuck is configured to be fixed by means of a further piston that acts on the end face of the at least one collet chuck.

13. A mold closing unit according to claim 1, wherein, a lubricant supply comprising at least one of the elements comprising a lubricant feed, a reservoir, a lubricant discharge point, a lubricant supply line and a lubricant plate, is provided on at least one of the end face of the unlocking element or in a bore in the platen in which a tie bar is configured to be received as force transmitting element.

14. A mold closing unit according to claim 1, wherein the at least one collet chuck comprises multiple parts and comprises clamping elements that are mounted to rotate transversely to the closing direction, wherein the clamping elements are mounted on a mounting element and are configured to be brought in and out of operative engagement with the at least one force transmitting element, either by means of an actuation element connected to an unlocking element or by means of a sliding sleeve.

15. A mold closing unit according to claim 1, wherein the at least one force transmitting element comprises a plurality of tie bars that are movable together with the movable platen and, when the injection mold is open, leave the mold clamping space clear.

16. A method for locking a force transmitting element to a platen of an injection molding machine for processing plastics and other plasticisable materials, wherein the injection molding machine comprises
a stationary platen,
a movable platen which is movable in relation to the stationary platen, which forms a mold clamping space between the movable platen and the stationary platen for the purpose of receiving injection molds, and which is movable along a closing direction, for closing and opening the injection mold,
a mold moving device for moving the movable platen into and out of a mold closure position of parts of an injection mold that are received between the platens,
at least one force transmitting element, which is connected to one platen of the movable platens and the stationary platen and, at its end spaced from the platens, comprises an actuable portion that is associated with the other platens of the movable platen and the stationary platen and is actuable for an operative engagement,
wherein, when the parts of the injection mold are in the mold closure position with the other platen, the actuable portion is positively locked by means of at least one locking device, and, in this locked condition, a closing force that acts by way of the at least one force transmitting element is applied,
wherein the force transmitting element is mounted in floating manner on the other platens by means of at least one collet chuck that is at the same time connected within the at least one locking device to at least one piston of a piston-cylinder unit, which applies the closing force,
wherein at least one unlocking element (55, 155) is put under load from a cylindrical chamber (48, 148) for the purpose of opening the collet chuck (16, 116), and in that when the unlocking element (55) abuts by means of its end face against a tie bar (14) as force transmitting element then the injection mould (M) is opened at high pressure from this cylinder chamber (48, 148).

17. A method according to claim 16, wherein the at least one collet chuck is forcibly locked to the at least one force transmitting element and a high pressure is generated in the locked condition by means of the at least one piston, for generating the closing force.

18. A method according to claim 16, wherein the at least one collet chuck is radially resiliently deformed by means of a thrust piece, which is arranged on at least one unlocking element arranged centrally in relation to the at least one collet chuck.

19. A method according to claims 16, wherein the at least one piston is moved by way of the at least one collet chuck with at least one sliding sleeve on at least one unlocking element that is arranged centrally in the collet chuck.

20. A method according to claim 18, wherein the at least one unlocking element is guided movably within a sliding sleeve as a mounting, or within an integrally formed element as a mounting, relative to a cylinder cover of a cylinder for the at least one piston.

21. A method according to claim 16, wherein, in a radially resiliently deformed, open condition the at least one collet chuck that is mounted axially movably on the platen comprises a receiving opening into which the actuable portion actuable by the at least one collet chuck is introduced, wherein a radial deformation of the at least one collet chuck is then reversed and as a result the at least one collet chuck is connected, with active closing and detachably with positive engagement, to the force transmitting element.

22. A method according to claim 16, wherein, in a radially undeformed, open condition, the at least one collet chuck that is mounted axially movably on the platen comprises a receiving opening into which the actuable portion actuable by the at least one collet chuck is introduced, wherein the at least one collet chuck is then radially inwardly resiliently deformed and as a result the at least one collet chuck is connected, with passive closing and detachably with positive engagement, to the force transmitting element.

23. A method according to claims 16, wherein the at least one collet chuck comprises multiple parts and comprises clamping elements that are mounted to rotate transversely to the closing direction, wherein the clamping elements are mounted on a mounting element and are brought into and out of operative engagement with the force transmitting element either by means of an actuation element connected to an unlocking element or by means of a sliding sleeve.

* * * * *